United States Patent
Dimitriev et al.

(10) Patent No.: US 12,130,834 B1
(45) Date of Patent: Oct. 29, 2024

(54) DISTRIBUTED APPENDING OF TRANSACTIONS IN DATA LAKES

(71) Applicant: VMware LLC, Palo Alto, CA (US)

(72) Inventors: Dimiter Dimitriev, Sofia (BG); Kostadin Georgiev, Sofia (BG); Abhishek Gupta, San Jose, CA (US); Christos Karamanolis, Los Gatos, CA (US); Richard P. Spillane, Palo Alto, CA (US)

(73) Assignee: VMware LLC, Palo Alto, CA (US)

( * ) Notice: Subject to any disclaimer, the term of this patent is extended or adjusted under 35 U.S.C. 154(b) by 0 days.

(21) Appl. No.: 18/159,673

(22) Filed: Jan. 25, 2023

(51) Int. Cl.
G06F 16/20 (2019.01)
G06F 3/06 (2006.01)
G06F 16/23 (2019.01)
G06F 16/27 (2019.01)

(52) U.S. Cl.
CPC ............ *G06F 16/27* (2019.01); *G06F 3/0604* (2013.01); *G06F 3/0643* (2013.01); *G06F 3/067* (2013.01); *G06F 16/2379* (2019.01)

(58) Field of Classification Search
CPC .... G06F 16/27; G06F 16/2379; G06F 3/0604; G06F 3/0643; G06F 3/067
See application file for complete search history.

(56) References Cited

U.S. PATENT DOCUMENTS

| | | | |
|---|---|---|---|
| 10,917,365 B1* | 2/2021 | Reddy | H04L 51/234 |
| 11,086,524 B1* | 8/2021 | Sun | G06F 3/0604 |
| 2012/0303578 A1* | 11/2012 | Calder | G06F 16/1787 707/613 |
| 2017/0255636 A1* | 9/2017 | Chun | G06F 3/0631 |
| 2018/0307856 A1* | 10/2018 | Nguyen | G06F 21/6218 |
| 2020/0104261 A1* | 4/2020 | Oh | G06F 9/528 |
| 2020/0250333 A1* | 8/2020 | Nemoto | H04L 9/3239 |
| 2022/0269671 A1* | 8/2022 | Dubeyko | G06F 3/0659 |

* cited by examiner

*Primary Examiner* — Mahesh H Dwivedi
(74) *Attorney, Agent, or Firm* — King Intellectual Asset Management

(57) ABSTRACT

Distributed appending of transactions in data lakes is described. A first message is received, at a first ingestion node of a plurality of ingestion nodes, as part of a transaction. The first message identifies a transaction identifier (ID) and a portion of data for the transaction. The data of the first message is persisted in temporary storage. A count of messages for the transaction for the first ingestion node is determined. Based on at least the count of messages, it is determined that the first ingestion node has received a complete set of messages for the transaction for the first ingestion node. A metadata write request is transmitted, by the first ingestion node, to a coordinator. The metadata write request includes a self-describing reference to persisted data. The self-describing reference identifies the first ingestion node, location information of the persisted data, and a range of the first data.

20 Claims, 19 Drawing Sheets

DISTRIBUTED APPENDING OF TRANSACTIONS IN DATA LAKES

BACKGROUND

Petabyte-scale data analytics platforms are built on two principles: a) scale-out cloud storage with wide bandwidth, in which each data object is globally identifiable and accessible; and b) separate scale-out compute infrastructure in which data processing is distributed across multiple nodes to achieve scale. Implementing consistency, or any other transactional property, in such environments requires tight coordination across many compute nodes (hosts) and may quickly become a scale and performance bottleneck.

A data lake is where unstructured data is stored, while a data warehouse is where data is stored in a structured format such as tables. In common data lakes, data is stored as files or objects, often in open formats, such as Parquet and ORC, and may be accessed through quasi-standard protocols, such as S3 and Hadoop Distributed File System (HDFS). Open-source query engines, including Presto/Trino and SparkSQL are used on top of file/object protocols to offer a SQL interface to the data, much like traditional data warehouses. However, unlike data warehouses, metadata management may use open formats (e.g., Hive and Spark RDD) that integrate with open-source compute platforms.

In a distributed data lake, monotonically growing data sets are accumulated, processed, and stored by a set of distributed, potentially heterogeneous nodes. It is often necessary to provide read access to such distributed data sets with transaction guarantees typical for traditional database management systems (DBMSs), in particular with snapshot isolation. This allows, for example, executing join queries without the data in the underlying tables, which can be distributed differently, and undergoing unexpected changes while the query is being evaluated.

To retain the independent and heterogeneous nature of nodes in the distributed lake, it is important to allow these nodes to operate independently, which precludes blocking coordination during normal operation or during recovery, and requires that each node is able to optimize the granularity of its processing and persistence operations independently of the latency at which it makes its data available for reading via the data lake. Meeting these requirements simultaneously may be challenging.

Ingested streaming data may be partitioned over the nodes of the data lake by processing criteria, or other criteria that allows transaction guarantees to be provided. A data distribution scheme that optimizes processing will even out the load over the nodes, and/or route incoming data to nodes that already contain related data such as reference data which is required to pre-process the incoming data before it can be persisted. A data distribution scheme that optimizes query processing with transactional guarantees, however, can route incoming data as well as queries based on their transactional scope, for example, all data that will ever participate in common transactions may be routed to the same node.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Aspects of the disclosure provide solutions for distributed appending of transactions in data lakes. Solutions include: receiving, at a first ingestion node of a plurality of ingestion nodes, as part of a transaction, a first message, the first message indicating a transaction identifier (ID), a first count of messages for the transaction, and a portion of data for the transaction; persisting the data of the first message in temporary storage; determining a second count of messages for the transaction for the first ingestion node; based on at least the second count of messages, determining that the first ingestion node has received a complete set of messages for the transaction for the first ingestion node; and transmitting, by the first ingestion node, to a coordinator, a metadata write request, the metadata write request indicating the transaction identifier (ID), the first count of messages, and the second count of messages, and including a self-describing reference to persisted data of the set of messages for the transaction for the first ingestion node, wherein the self-describing reference indicates the first ingestion node, location information of the persisted data, and a range of the first data.

BRIEF DESCRIPTION OF THE DRAWINGS

The present description will be better understood from the following detailed description read in the light of the accompanying drawings, wherein.

Figure 1:
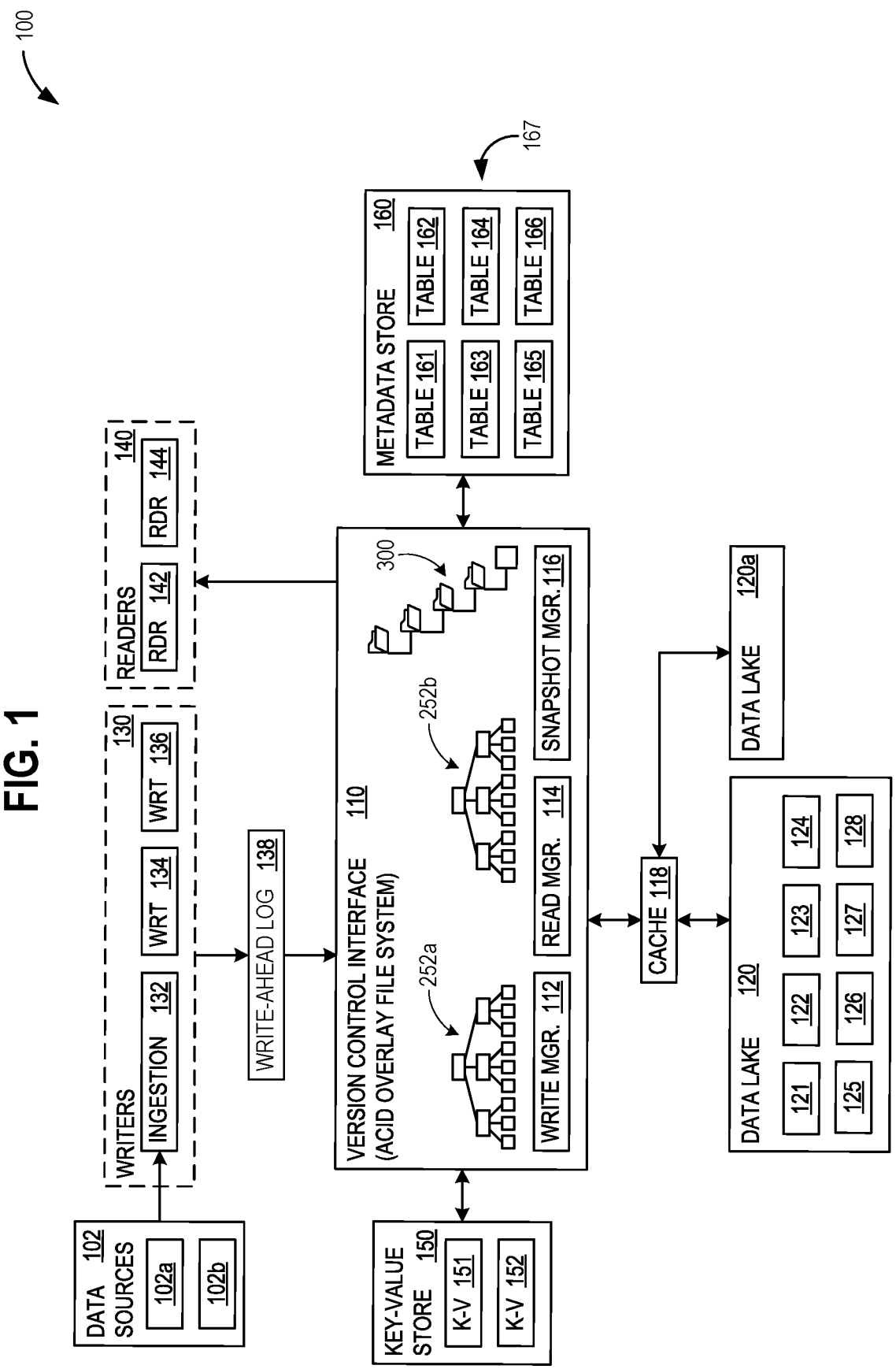
FIG. 1 illustrates an example architecture that advantageously provides abstracted access to a large scale (e.g., multi-host or multi-node) data lake with an overlay file system, and which may benefit from various optimizations disclosed herein.

Any of the above figures may be combined into a single example or embodiment.

DETAILED DESCRIPTION

In a data lake, a table represents a set of data that may be organized in different formats including, for example, column-based or row-based optimized formats. The data of a table may reside in one or more data objects (e.g., files, objects, volumes) stored on a data lake. The mapping of tables to data objects as well as some of the information about columns, rows or other table metadata may be stored in a metadata service (e.g., a dedicated file, a data base like Hive, etc.). Examples of the disclosure separate compute and storage capability, so that each is able to scale independently. Example storage solutions permit access to data belonging to any table from any compute host.

A transaction, for example ingesting data, may span multiple tables. The set of tables that transactions involve may allow a table-to-host mapping that minimizes cross-host coordination, because a typical transaction may reference only a small subset of the tables, even in a large data warehouse. Each transaction is able to access a subset of tables in one table group (or data group or schema). In some scenarios, multiple transactions may consistently access the same table group. The knowledge of table groups assists with determining efficient optimization heuristics. In a simple case, a small table group may be handled by a single host, thus eliminating any need for cross-host coordination for the transactions accessing that table group.

Aspects of the disclosure support a set of optimizations including: (1) executing atomic and durable data ingestion transactions that include operations on multiple separate data sets (e.g., tables) that are freely distributed; (2) supporting queries with snapshot isolation on the data ingested by these transactions, retaining their atomicity and making them visible with low latency; (3) allowing data to be partitioned over the processing nodes based on other, non-transactional partitioning criteria that provide processing optimization; and (4) retaining scalability, such as the ability to add more nodes without creating bottlenecks. This final goal precludes the use of blocking distributed synchronization, such as 2-phase commit (2PC). It also rules out re-shuffling schemes in which data is partitioned first by one criteria and then by another, when one of the partition layers cannot be scaled freely.

Aspects of the disclosure improve the functioning of computing devices at least by reducing the computing power consumed when operating data lakes. For example, both the workload and number of nodes required by a compute tier of a data lake is reduced, at least in part, by publishing a data available message comprising a self-describing reference. The use of data available messages having self-describing references enables the use of a set of separate ingestion nodes that may be scaled independently from other resources, as described below. Additionally, transmitting a metadata write request indicating a transaction ID and including a self-describing reference to persisted data enables optimizing the operation of the set of separate ingestion nodes, as described below. One of the optimizations includes file size optimization, which may be accomplished by an ingestion node persisting received data associated with a transaction identifier (ID) in permanent storage together in a single file. These optimizations improve performance sufficiently to reducing the total number of computing nodes, thereby reducing computing power consumption.

Aspects of the disclosure provide for distributed transaction processing in which a write ahead log (WAL) provides permanent message identity. A plurality of ingestion nodes establishes the relation between messages, the tables represented in the messages, and the transactions in which the messages are grouped, and report the information to a coordinator. The coordinator continually extracts the transactionally complete sub-set of all data currently being processed by the ingestion nodes and makes it available for reading.

Example advantages include that data, which has not yet been permanently persisted, and does not exist at the level of granularity in which it can be permanently persisted, may still be read repeatedly with the same consistent results, including after either the ingestion nodes, or the coordinator, or both, have crashed and are at some stage of recovery. This is able to occur even without requiring recovery coordination between any of the nodes.

Data, which has previously been read before it was written to permanent storage, may be written to permanent storage without any blocking coordination between the ingestion node responsible for writing it to permanent storage and the coordinator that continues to make the data available for reading. The same read result is returned before, during, and after the data storage location has been changed by the ingestion node.

FIG. 1 illustrates an architecture 100 that advantageously improves access to a data lake 120 and with an overlay file system, identified as a version control interface 110. As indicated, version control interface 110 is able to access multiple data lakes, including a data lake 120a. As described herein, architecture 100 may benefit from various optimizations disclosed herein and may be implemented in conjunction with architecture 400 of FIG. 4 and/or architecture 500 of FIG. 5.

Figure 2A:
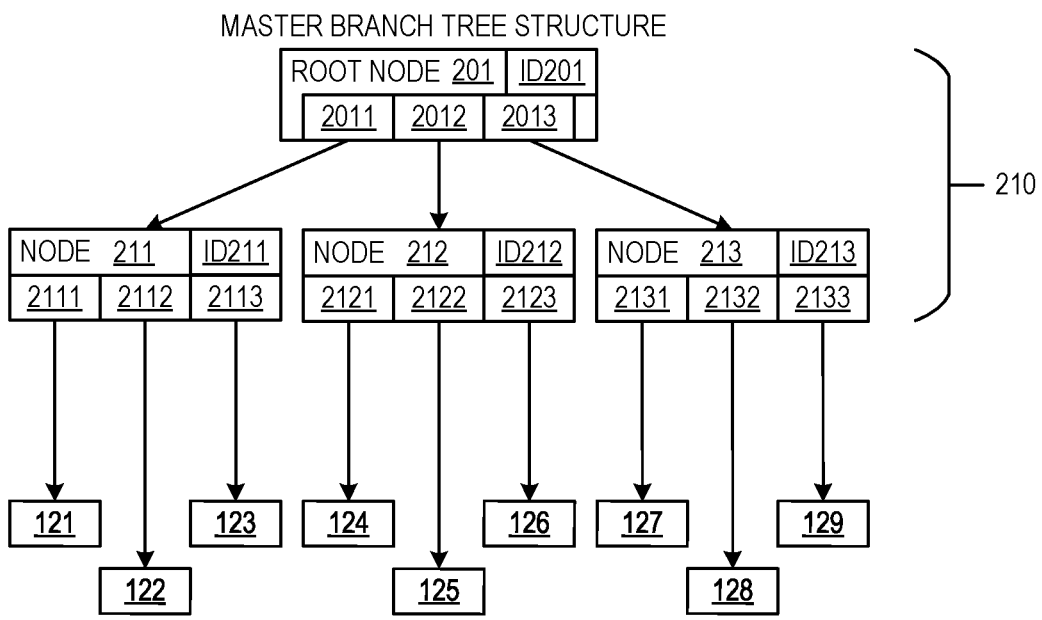
FIGS. 2A and 2B illustrate examples of a tree data structure and a master branch with multiple point-in-time snapshots of its state, as may be used by the architecture of FIG. 1, with FIG. 2A showing detail and FIG. 2B showing various points in time.
Figure 2B:
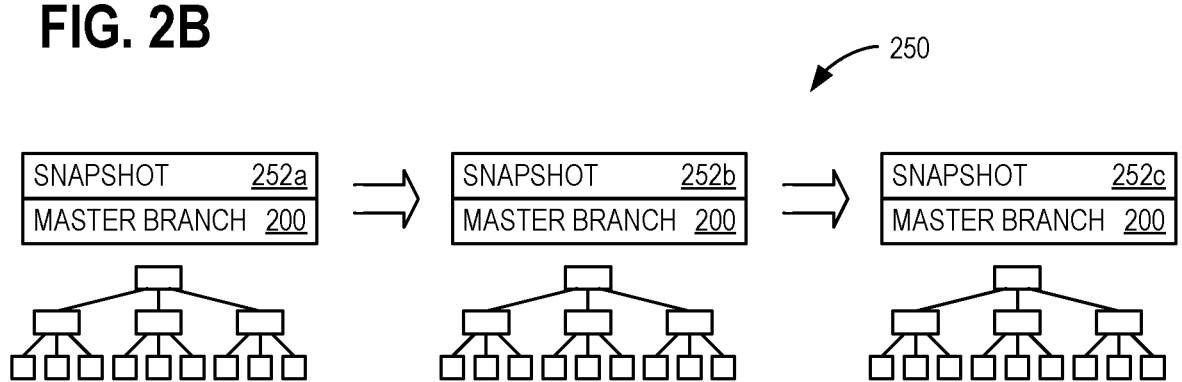

In some examples, version control interface 110 overlays multiple data stores, providing data federation (e.g., a process that allows multiple data stores to function as a single data lake). A write manager 112 and a read manager 114 provide a set of application programming interfaces (APIs) for coordinating access by a plurality of writers 130 and a plurality of readers 140. Writers 130 and readers 140 include, for example, processes that write and read, respectively, data to/from data lake 120. Version control interface 110 leverages a key-value store 150 and a metadata store 160 for managing access to the master branch, as described in further detail herein. A master branch 200 is illustrated and described in further detail in relation to FIGS. 2A and 2B. FIG. 2A shows the tree structure and FIG. 2B shows snapshots in various points in time. A notional data partitioning structure 300, representing the hierarchical namespace of the overlay file system, is illustrated and described in further detail in relation to FIG. 3A.

A master branch (main branch, public branch) is a long-lived branch (e.g., existing for years, or indefinitely) that can be used for both reads and writes. It is the default branch for readers unless the readers are being used to read in the context of a transaction. The master branch includes a set (e.g., list) of snapshots, each of which obey conflict resolution policies in place at the time the snapshot was taken. The snapshots may be organized in order of creation. The term "master branch" is a relational designation indicating that other branches (e.g., private branches and workspace branches) are copied from it and merged back into it.

A workspace branch is forked off the master branch for writing and/or reading, and then either merged back into the master branch or aborted. Reading occurs in the context of a transaction. In some examples, a workspace branch represents a single SQL transaction. In some examples, there is a one-to-one relationship between a workspace and a transaction, and the lifecycle of a workspace branch is the same as that of its corresponding transaction.

A private branch is a fork from the master branch used to facilitate write operations in an isolated manner, before being merged back into the master branch. A private branch may also act as a write buffer for streaming data. Private branches are used for data ingestion, such as streaming incoming data or asynchronous transactions. In transactional data ingestion, clients send batches of data to be inserted for possibly multiple tables within one data group. The incoming data may span one or more data messages. Each batch of data serves as a boundary for an asynchronous transaction. Private branches improve the concurrency of the system and may exist for the duration of the execution of some client-driven workflow, e.g., a number of operations or transactions, until being merged back into the master branch. They may be used as write buffers (e.g., for write-intensive operations such as ingesting data streaming), and reading is not permitted. Multiple writers and multiple streams may use the same private branch.

In some examples, a merge process iterates through new files, changed files, and deleted files in the private or workspace branch, relative to what had been in master branch when the merging private branch had been forked, to identify changes. The merging process also identifies changes made to the master branch (e.g., comparing the current master branch with the version of the master branch at the time of forking) concurrently with changes happening in a private branch or a workspace branch. For all of the identified changes, the files (more generally, data objects) are compared to the files at the same paths in the master branch to determine if a conflict exists. If there is a conflict, a conflict resolution solution is implemented. Aspects of the disclosure are operable with multiple conflict resolution policies.

To enable concurrent readers and writers, snapshots are used to create branches. Some examples use three types of branches: a master branch (only one exists at a time) that is used for reading both data and metadata at a consistent point in time, a private branch (multiple may exist concurrently) that acts as a write buffer for synchronous transactions and excludes other readers, and a workspace branch (multiple may exist concurrently) that facilitates reads and writes for certain transactions, such as SQL transactions. Private branches and workspace branches may be forked from any version of a master branch, not just the most recent one. In some examples, even prior versions of a master branch snapshot may be written to.

In some examples, the master branch is updated atomically only by merging committed transactions from the other two types of branches. Readers use either the master branch to read committed data or a workspace branch to read in the context of an ongoing transaction. Writers use either a private branch or a workspace branch to write, depending on the type of workload, ingestion, or transactions respectively. Private and workspace branches may be instantiated as snapshots of the master branch by copying the root node of the tree (e.g., the base). In some examples, writers use copy-on-write (CoW) to keep the base immutable for read operations (private branches) and for merging. CoW is a technique to efficiently create a copy of a data structure without time consuming and expensive operations at the moment of creating the copy. If a unit of data is copied but not modified, the "copy" may exist merely as a reference to the original data, and only when the copied data is modified is a physical copy created so that new bytes may be written to memory or storage.

To write to the data lake, whether in bulk (e.g., ingest streams of large number of rows) or individual operation (e.g., a single row or a few rows), a writer checks out a private branch and may independently create or write data objects in that branch. That data does not become visible to other clients (e.g., other writers and readers). At a fixed interval or when enough data is accumulated, the completed transactions are committed. This creates space for new messages. Private branches are merged in order to meet data read latency requirements (e.g., in a service level agreement, or SLA), to ensure solid performance by leveraging buffering, and to reduce replay time in the event of a recovery or restart.

Even after a commit, the new data remain visible only in the writer's private branch. Other readers have access only to a public master branch (the writer can also read from the writer's own private branch). To ensure correctness, a merging process occurs from the private branches to the master branch thus allowing the new data to become publicly visible in the master branch. This enables a consistent and ordered history of writes. In this manner, branching and snapshots provide for ACID.

Figure 17:
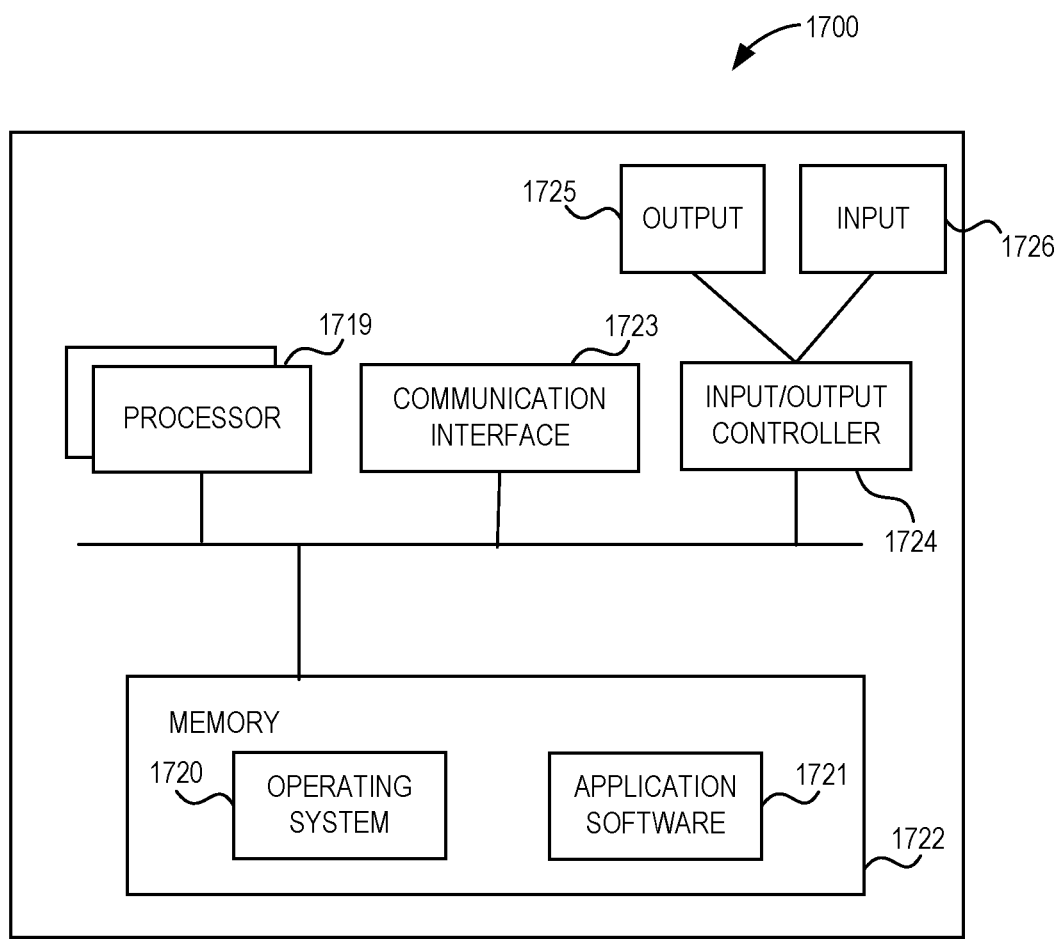
FIG. 17 illustrates a block diagram of a computing apparatus that may be used as a component of examples of the disclosure such as the architecture of FIGS. 1, 4 and 5.

In some examples, architecture 100 is implemented using a virtualization architecture, which may be implemented on one or more computing apparatus 1700 of FIG. 17. An example computing framework on which the components of FIG. 1 may be implemented and executed uses a combination of virtual machines, containers, and serverless computing abstractions. Example storage on which the data lake may be implemented is a cloud storage service, or a hardware/software system. The storage may be a file system or an object storage system.

Some examples of version control interface 110 support common query engines, while also enabling efficient batch and streaming analytics workloads. Federation of multiple heterogeneous storage systems may be supported, and data and metadata paths may be scaled independently and dynamically, according to evolving workload demands. ACID semantics may be provided using optimistic concurrency control, which also provides versioning, and lineage tracking for data governance functions. This facilitates tracing the lifecycle of the data from source through modification (e.g., who performed the modification, and when). In some examples, a host is defined as a computing resource unit for purposes of ACID. That is, a single physical machine may crash, stopping all running processes on that machine, while a nearby separate physical machine continues running. Thus, cross-host coordination is needed at least for durability.

Data lake 120 holds multiple data objects, illustrated at data objects 121-128. Data lake 120 also ingests data from data sources 102, which may be streaming data sources, via an ingestion process 132 that formats incoming data as necessary for storage in data lake 120. Data sources 102 is illustrated as comprising a data source 102a and a data source 102b. Data objects 121-128 may be structured data (e.g., database records), semi-structured (e.g., logs and telemetry), or unstructured (e.g., pictures and videos).

Inputs and outputs are handled in a manner that ensures speed and reliability. Writers 130, including ingestion process 132, writer 134, and writer 136, leverage a WAL 138 for crash resistance which, in combination with the persistence properties of the data lake storage, assists with the durability aspects of ACID. WAL 138 is a separate service in which write operations are persisted in their original order of arrival and is used to ensure transactions are implemented even in the presence of failures. In some examples, WAL 138 is check-pointed with the update of the most-recent snapshot hash in order to reduce the replay time in case of a recovery (e.g., avoid replaying everything since inception of the branch). The values for the branch keys in key-value store 150 contain the offset of a commit operation taken out of WAL 138.

For example, in the event of a crash (e.g., software or hardware failure), crash recovery functionality may replay WAL 138 to reconstruct messages or re-apply state changes in order to recover the state prior to the crash. WAL 138 provides redo information that assists with atomicity. In some examples, WAL 138 is implemented using Kafka.

In some examples, version control interface 110 uses a cache 118 to interface with data lake 120 (or multiple data lakes 120, when version control interface 110 is providing data federation) to improve operations, for example operational speed. Write manager 112 manages writing objects (e.g., files) to data lake 120. Although write manager 112 is illustrated as a single component, it may be implemented using a set of distributed functionality, similarly to other illustrated components of version control interface 110.

Figures 3A, 3B:
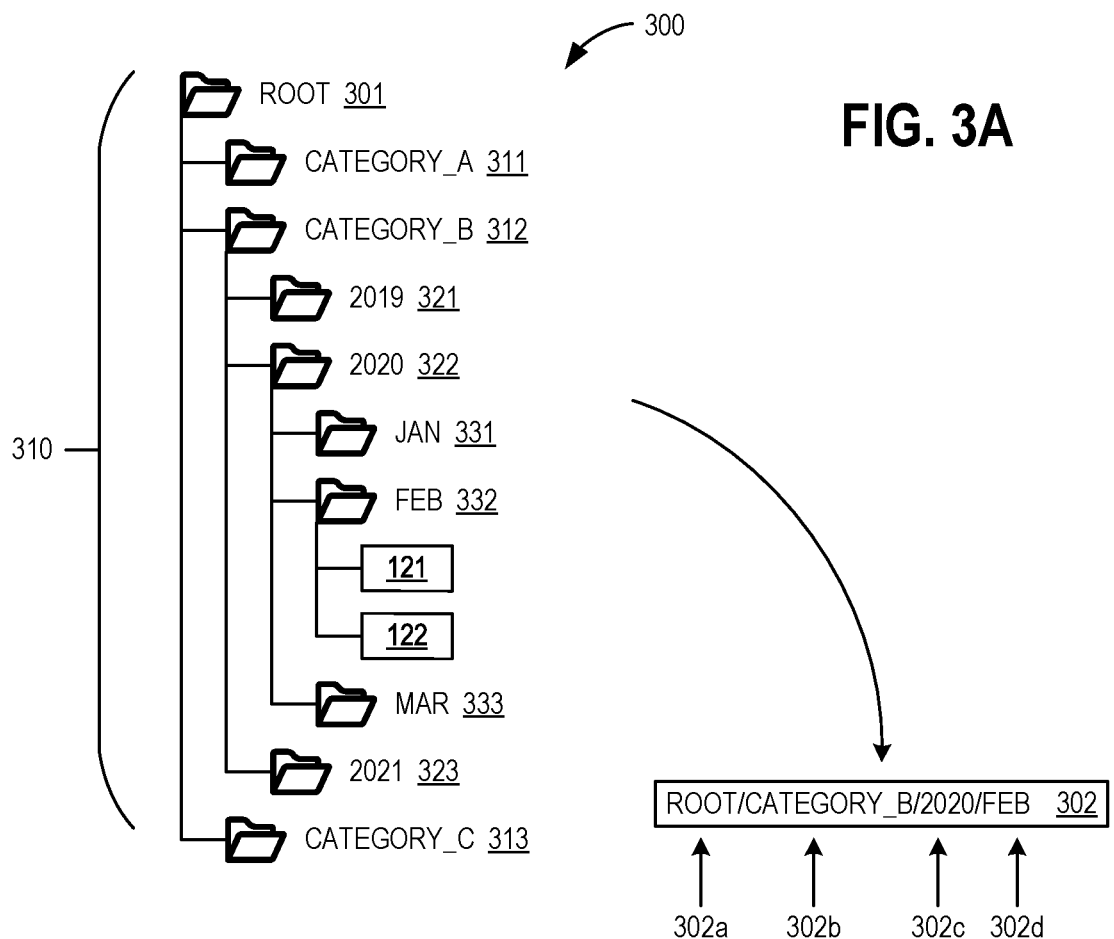
FIG. 3A illustrates an example data partitioning structure, as may be used by the architecture of FIG. 1.
FIG. 3B illustrates examples of data, as may be used by the architecture of FIG. 1.

Metadata store 160 organizes data (e.g., data objects 121-128) into a plurality of tables 167, such as a table 161, a table 162, a table 163, a table 164, a table 165, and a table 166. Examples of tables are shown in FIG. 3B. Maps of tables 161-166 may be stored in metadata store 160 and/or on servers (see FIG. 4) hosting an implementation of version control interface 110. A table provides a hierarchical namespace, typically organized by a default partitioning policy of some of the referenced data attributes, e.g., the date (year/month/day) of the data creation, as indicated for data partitioning structure 300 in FIG. 3A. For example, a partition holds data objects created in a specific day. If one of readers 140, illustrated as including a reader 142 and a reader 144, performs a query using a structured query language (SQL) statement that performs a SELECT operation over a range of dates, then the organization of data partitioning structure 300 indicates the appropriate directories and data objects in the overlay file system to locate the partitions from which to read objects.

Data may be written in data lake 120 in the form of transactions, for ACID purposes. This ensures that all of the writes that are part of a transaction are manifested at the same time (e.g., available for reading by others), so that either all of the data included in the transaction may be read by others (e.g., a completed transaction) or none of the data in the transaction may be read by others (e.g., an aborted transaction). Atomicity guarantees that each transaction is treated as a single unit, which either succeeds completely, or fails completely. Consistency ensures that a transaction can only transition data from one valid state to another. Isolation ensures that concurrent execution of transactions leaves the data in the same state that would have been obtained if the transactions were executed sequentially. Durability ensures that once a transaction has been committed, the results of the transaction (its writes) will persist even in the case of a system failure (e.g., power outage or crash).

Version control interface 110 atomically switches readers to a new master branch (e.g., switches from master branch snapshot 252a to master branch snapshot 252b) after a transaction is committed and the workspace branch (or private branch) is merged back into a master branch. Consistency is maintained during these switching events by moving new readers 140 from the prior master branch to the new master branch at the same time, so that all new readers 140 see the same version of data. In some examples, older readers are not moved, in order to maintain consistency for those readers. To facilitate the move, a key-value store 150 has a key-value entry for each master branch, as well as key-value entries for private and workspace branches. A key-value store is a data storage paradigm designed for storing, retrieving, and managing associative arrays. Data records are stored and retrieved using a key that uniquely identifies the record and is used to find the associated data (values), which may include attributes of data associated with the key.

The key-value entries are used for addressing the root nodes of branches. For example, a key-value pair 151 points to a first version of master branch 200 (or master branch snapshot 252a), and a key-value pair 152 points to a second version of master branch 200 (or master branch snapshot 252b). In some examples, key-value store 150 is a distributed key-value store, such as ETCD.

There is a single instance of a namespace (a master branch) for each group of tables, in order to implement multi-table transactions. In some examples, to achieve global consistency for multi-table transactions, read requests from readers 140 are routed through key-value store 150, which tags them by default with the key-value pair for the most recent master branch snapshot. Because the branching and snapshot process described above provides for ACID properties, it may be leveraged for multi-table transaction consistency. Time travel may be supported by some examples, in which a reader instead reads data objects 121-128 from data lake 120 using a prior master branch snapshot.

A 2PC process (or protocol), which updates key-value store 150, is used to perform atomic execution of writes when a set of tables accessed together, known as a table group, spans multiple hosts (e.g., multiple physical servers) and coordination between the different hosts is needed.

Tables 161-166 may be represented using a tree data structure 210 of FIG. 2A for master branch 200. Turning briefly to FIG. 2A, the structure of master branch 200 comprises a root node 201, which is associated with an identifier ID201, and contains references 2011-2013 to lower nodes 211-213. Tree data structure 210 may be stored in data lake 120 or in a separate storage system. That is, the objects that comprise the overlaid metadata objects do not need to be stored in the same storage system as the data itself. For example, tree data structure 210 may be stored in a relational database or key-value store.

The identifiers, such as identifier ID201 may be any universally unique identifiers (UUIDs). One example of a UUID is a content-based UUID. A content-based UUID has an added benefit of content validation. An example of an overlay data structure that uses content-based UUIDs is a Merkle tree, although any cryptographically unique ID is suitable. The data structures implement architecture 100 (the ACID overlay file system) of FIG. 1. In some examples, the nodes of the data structures are each uniquely identified by a UUID. Any statistically unique identification may be used, if the risk of a collision is sufficiently low. A hash value is an example. In the case where the hash is that of the content of the node, the data structure may be a Merkle tree. However, aspects of the disclosure are operable with any UUID, and are not limited to Merkle trees, hash values, or other content-based UUIDs.

In an overlay file system that uses content-based UUIDs for the data structure nodes (e.g., a Merkle tree), identifier ID201 comprises the hash of root node 201, which contains the references to nodes 211-213. Node 211, which is associated with an identifier ID211, has reference 2111, reference 2112, and reference 2113 (e.g., addresses in data lake 120) to data object 121, data object 122, and data object 123, respectively. In some examples, identifier ID211 comprises a hash value (or other unique identifier) of the content of the node, which includes references 2111-2113. For example, in intermediate nodes, the contents are the references to other nodes. The hash values may also be used for addressing the nodes in persistent storage. Those skilled in the art will note that the identifiers need not be derived from content-based hash values but could be randomly generated. Content-based hash values (or other one-way function values) in the nodes, however, have an advantage in that they may be used for data verification purposes.

Node 212, which is associated with an identifier ID212, has reference 2121, reference 2122, and reference 2123 (e.g., addresses in data lake 120) to data object 124, data object 125, and data object 126, respectively. In some examples, identifier ID212 comprises a hash value of references 2121-2133. Node 213, which is associated with an identifier ID213, has reference 2131, reference 2132, and reference 2133 (e.g., addresses in data lake 120) to data object 127, data object 128, and data object 129, respectively. In some examples, identifier ID213 comprises a hash value of references 2131-2133. In some examples, each node holds a component of the name space path starting from the table name (see FIG. 3). Nodes are uniquely identifiable by their hash value (e.g., identifiers ID211-ID213). In some examples, tree data structure 210 comprises a Merkle tree, which is useful for identifying changed data, and facilitates versioning and time travel. However, aspects of disclosure are operable with other forms of tree data structure 210. Further, the disclosure is not limited to hash-only IDs (e.g., Merkel tree). However, hashes may be stored for verification.

The term "master branch" is a relational designation indicating that other branches (e.g., private branches) are copied from it and merged back into it. In some examples, a merge process iterates through new files, changed files, and deleted files in the private or workspace branch, relative to what had been in master branch when the merging private branch had been forked, to identify changes. The merging process also identifies changes made to the master branch (e.g., comparing the current master branch with the version of the master branch at the time of forking) concurrently with changes happening in a private branch. For all of the identified changes, the files (more generally, data objects) are compared to the files at the same paths in master branch 200 to determine if a conflict exists. If there is a conflict, a conflict resolution solution is implemented. Aspects of the disclosure are operable with multiple conflict resolution policies.

Since master branch 200 may be constantly changing, various versions are captured in snapshots, as shown in FIG. 2B. A snapshot is a set of reference markers for data at a particular point in time. In relation to master branch 200, a snapshot is an immutable copy of the tree structure, whereas a branch (e.g., a private branch) is a mutable copy. A snapshot is uniquely identified by its unique root node for that instance. Each snapshot acts as an immutable point-in-time view of the data. A history of snapshots may be used to provide access to data as of different points in time and may be used to access data as it existed at a certain point in time (e.g., rolled back in time for time travel).

A snapshot manager 116 handles the generation of master branch snapshots 252a and 252b. New master branches are created upon merging data from a private branch. A private branch is merged with the master branch when it contains data of committed transactions (e.g., a private branch cannot be merged with the master, if it contains data of an uncommitted transaction). There may be different policies used for merging private branches to the master branch. In some examples, as soon as a single transaction commits, the private branch on which the transaction was executed is merged with the master branch. In some examples, multiple transactions may commit in a private branch before that branch is merged to the master. In such examples, the merging occurs in response to one of the following triggers: (1) a timer expires; (2) a resource monitor indicates that a resources usage threshold is met (e.g., available memory is becoming low); and (3) transactions associated with that branch are all committed. Other merge policies may also be implemented depending on the type of a transaction or the specification of a user. Also, merging may be performed in response to an explicit merge request by a client.

A commit creates a clean tree (e.g., tree data structure 210) from a dirty tree, transforming records into files with the tree directory structure. A merge applies a private branch to a master branch, creating a new version of the master branch. A flush persists a commit, making it durable, by writing data to persisted physical storage. Typically, master branches are flushed, although in some examples, private branches may also be flushed (in some scenarios). An example order of events is: commit, merge, flush the master branch (the private branch is now superfluous), then update a crash recovery log cursor position. However, if a transaction is large, and exceeds available memory, a private branch may be flushed. This may be minimized to only occur when necessary, in order to reduce write operations.

FIG. 2B shows an example in which a master branch 200 passes through three versions, with a snapshot created for each version. The active master branch 200 is also mutable, as private branches are merged into the current master branch. Merging involves incorporating new nodes and data from a private branch into the master branch, replacing equivalent nodes (having old contents), adding new nodes, and/or deleting existing nodes. However, there are multiple snapshots of master branch 200 through which the evolution of the data over time may be tracked. Read operations that are not part of a transaction may be served from a snapshot of the master branch. Typically, reads are served from the most recent master branch snapshot, unless the read is targeting an earlier version of the data (e.g., time travel). A table may comprise multiple files that are formatted for storing a set of tuples, depending on the partitioning scheme and lifetime of a private branch. In some examples, a new file is created when merging a private branch. A read may be serviced using multiple files, depending on the time range on the read query. In some examples, parquet files are used. In some examples, a different file format is used, such as optimized row columnar (ORC), or Avro.

Master branch snapshot 252a is created for master branch 200, followed by a master branch snapshot 252b, which is then followed by a master branch snapshot 252c. Master branch snapshots 252a-252c reflect the content of master branch 200 at various times, in a linked list 250, and are read-only. Linked list 250 provides tracking data lineage, for example, for data policy compliance. In some examples, a data structure other than a linked list may be used to capture the history and dependencies of branch snapshots. In some examples, mutable copies of a branch snapshot may be created that can be used for both reads and writes. Some examples store an index of the linked list in a separate database or table in memory to facilitate rapid queries on time range, modified files, changes in content, and other search criteria.

FIG. 3A illustrates data partitioning structure 300, which is captured by the hierarchical namespace of the overlay file system (e.g., version control interface 110). Partitioning is a prescriptive scheme for organizing tabular data in a data lake file system. Thus, data partitioning structure 300 has a hierarchical arrangement 310 with a root level folder 301 and a first tier with folders identified by a data category, such as a category_A folder 311, a category_B folder 312, and a category_C folder 313. Category_B folder 312 is shown with a second tier indicating a time resolution of years, such as a year-2019 folder 321, a year-2520 folder 322, and a year-2521 folder 323. Year-2520 folder 322 is shown with a third tier indicating a time resolution of months, such as a January (Jan) folder 331 and a February (Feb) folder 332. Feb folder 332 is shown as having data object 121 and data object 122. In some examples, pointers to data objects are stored in the contents of directory nodes.

The names of the folders leading to a particular object are path components of a path to the object. For example, stringing together a path component 302a (the name of root level folder 301), a path component 302b (the name of category_B folder 312), a path component 302c (the name of year-2520 folder 322), and a path component 302d (the name of Feb folder 332), gives a path 302 pointing to data object 121.

A table is a collection of files (e.g., a naming convention that indicates a set of files at a specific point in time), and a set of directories in a storage system. In some examples, tables are structured using a primary partitioning scheme, such as time (e.g., date, hour, minutes), and directories are organized according to the partitioning scheme. In an example of using a timestamp for partitioning, an interval is selected, and incoming data is timestamped. At the completion of the interval, the data that came in during the interval is collected into a common file. Other organization, such as data source, data user, recipient, or another, may also be used, in some examples. This permits rapid searching for data items by search parameters that are reflected in the directory structure.

Tables may be organized by rows or columns. FIG. 3B illustrates examples of columnar versions of tables 161 and 164. Table 161 is illustrated as indicating data object 121 and data object 122, and table 164 is illustrated as indicating data object 127 and data object 128, all of which are also shown in FIG. 1.

Figure 4:
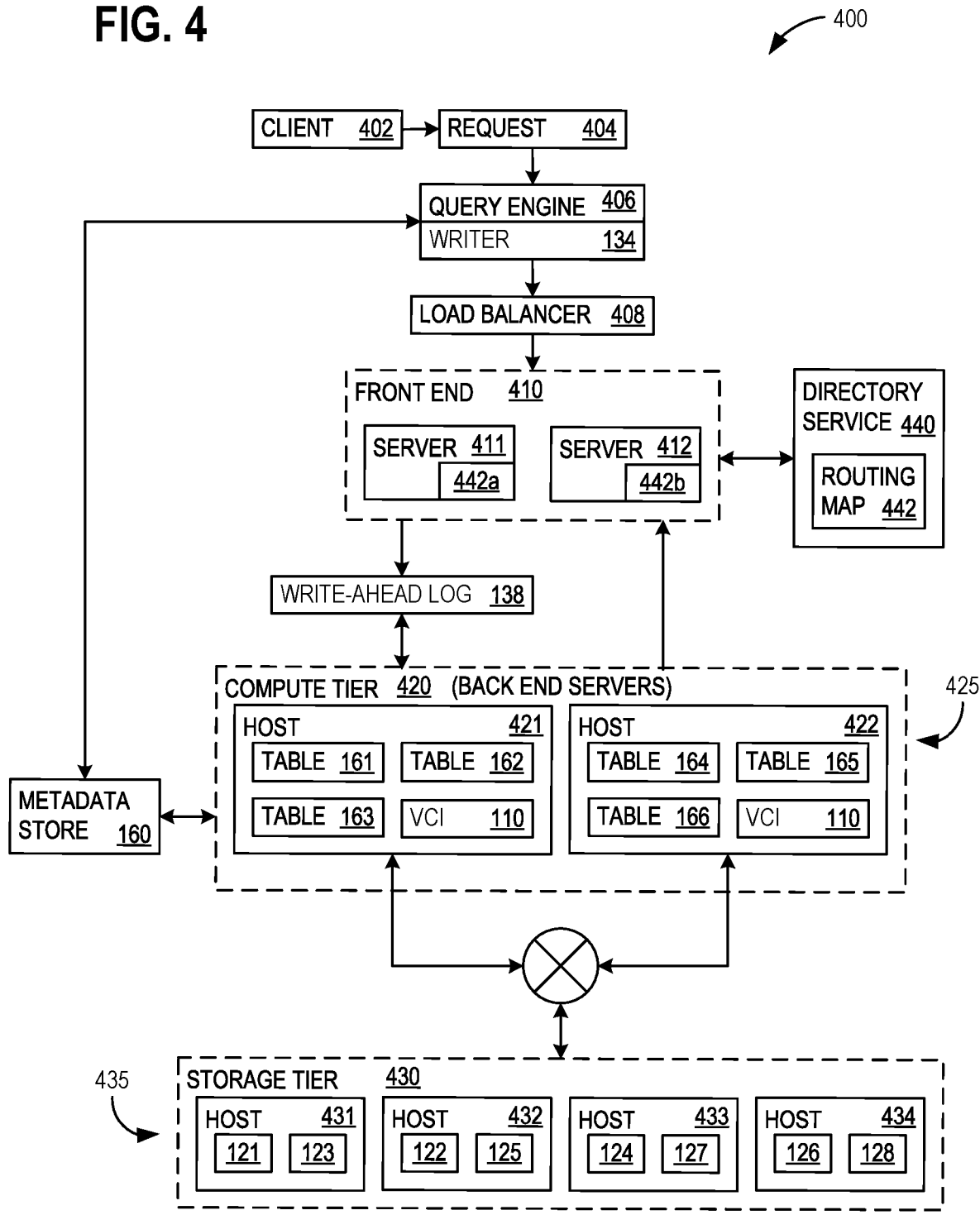
FIG. 4 illustrates an example architecture that advantageously provides a baseline for optimization schemes disclosed herein, and may be built on top of an architecture such as the example of FIG. 1.

FIG. 4 illustrates architecture 400 that advantageously provides a baseline for optimization schemes disclosed herein, and may be built on top of architecture 100. Architecture 400 has a front end 410 and separate compute tier 420 (back end) and storage tier 430. A client 402 generates a request 404 through a query engine 406, which may be writer 134 (or another entity) to version control interface 110 for accessing data in data lake 120. In some examples, request 404 goes to front end 410 first, which sends request 404 to compute tier 420. Examples of the disclosure may be storage agnostic, and use an external service for actual storage.

Data objects are stored in storage tier 430 in a set of hosts 435 (each host a separate compute node), which includes hosts 431-434. Data objects 121 and 123 reside on host 431, data objects 122 and 125 reside on host 432, data objects 124 and 127 reside on host 433, and data objects 126 and 128 reside on host 434. It should be understood that the number of hosts and the placement of two data objects on each host is merely illustrative, and a larger number of hosts may be used, along with a larger number of data objects per host. Data lake 120 of architecture 100 may be comprised of one or more storage tiers 430.

Access to data objects is managed by compute tier 420, which has a set of hosts 425 (each host may be a separate compute node), including hosts 421 and 422, that hold plurality of tables 167 (see FIG. 1). Host 421 has ownership of tables 161-163 and an implementation of version control interface 110. Host 422 has ownership of tables 164-166 and an implementation of version control interface 110. For read-only operations, query engine 406 may identify relevant data objects in metadata store 160 and then just pull the data from storage tier using version control interface 110. In some examples, read operations also go through front-end 410, which pulls the data from storage tier 430. No commits are needed for read-only operations. However, for write operations, transactions are more involved, as described below.

For a write operation, a load balancer 408 selects a front-end server, such as server 411 or server 412 in front end 410. The write operation will need to access one or more tables of tables 161-166. A directory service 440 stores a routing map 442 that identifies which back-end server (i.e., which of hosts 421 and 422) owns the tables involved in the transaction. In some examples, directory service 440 may be ETCD, and may be the same entity as key-value store 150. In some examples, servers 411 and 412 cache local copies of routing map 442 as routing map 442a and routing map 442b, respectively. When servers detect that their local routing map copies are stale, they will retrieve a fresh copy of routing map 442 from directory service 440.

Writes are journaled in WAL 138 as messages, either directly by a front-end server, or via a back end server. For example, the front-end server sends the write message to the back end server, which sends it to WAL 138 to wait its turn. Since WAL 138 is first in first out (FIFO), in some examples, writes are held in WAL 138 until the proper host (e.g., host 421 or 422) that owns the proper table has acknowledged that the write operation is complete. For example, write operations affecting table 161 are sent to host 421 and write operations affecting table 165 are sent to host 422. As described above, version control interface 110, implemented on either host 421 or 422, consults metadata store 160 for the specific locations of affected data objects.

Architecture 400 efficiently scales transactions across nodes keeping overhead, required for consistency, to a minimum. In a SQL workload, a schema (e.g., a table group) represents the outline of tables and how tables are related to one another. A table contains various partitions, and partitions may contain multiple data files (e.g., in a Parquet or ORC format). A primary partitioning scheme may be derived from any table column. Typically, primary partitioning is date-time, although other partitioning schemes may be used. In architecture 400, the placement granularity is tables, although the same principles may be applied to another granularity level. Placement refers to ownership of a table (e.g., which back end server has read/write access on the table), which differ from physical storage location. In some examples, tables are physically stored in a shared object store (e.g., metadata store), and hosts 421 and 422 merely have ownership rights (e.g., read/write access rights) for specific tables.

A table may be owned by only a single host, the reference herein to moving operational control of a table among hosts means moving ownership rights or control of performing operations or computations for the table, even if the actual physical storage location of data in that table does not change. Table groups, however, may span multiple hosts. Because architecture 400 supports multi-table transactions, the consistency boundary may span from being within a single host, to spanning a few hosts, to spanning an entire cluster of hosts.

A transaction is started at front end 410, in which one of servers 411 and 412 (e.g., front end servers) acts as a routing node. The specific sever may be determined by load balancer 408. Back end servers (e.g., hosts 421 and 422) consume WAL 138 and act as the data path. When a transaction is started by client 402 for any table group, a routing node will inform all the backend nodes where the table group is partitioned. This information allows backend nodes to keep track of all the ongoing transactions and impose a resource quota. As and when the writes for the transaction come in, the routing node will send the writes to the backend node that owns the table.

Because a transaction may span across various tables, different writes in the transaction may end up on different back-end servers (such as host 421 and 422). When the transaction is committed, the routing node will decide whether the commit requires cross-host coordination, such as a 2PC. If all the writes of the transaction are for the tables owned by a single host, cross-host coordination will be avoided. Otherwise, the routing node will orchestrate the cross-host coordination among the participating backend nodes. Once the transaction is committed, the hash of the snapshot will be updated in key-value store 150. WAL 138 is then checkpointed to reflect a new crash recovery point after the transaction.

Figure 5:
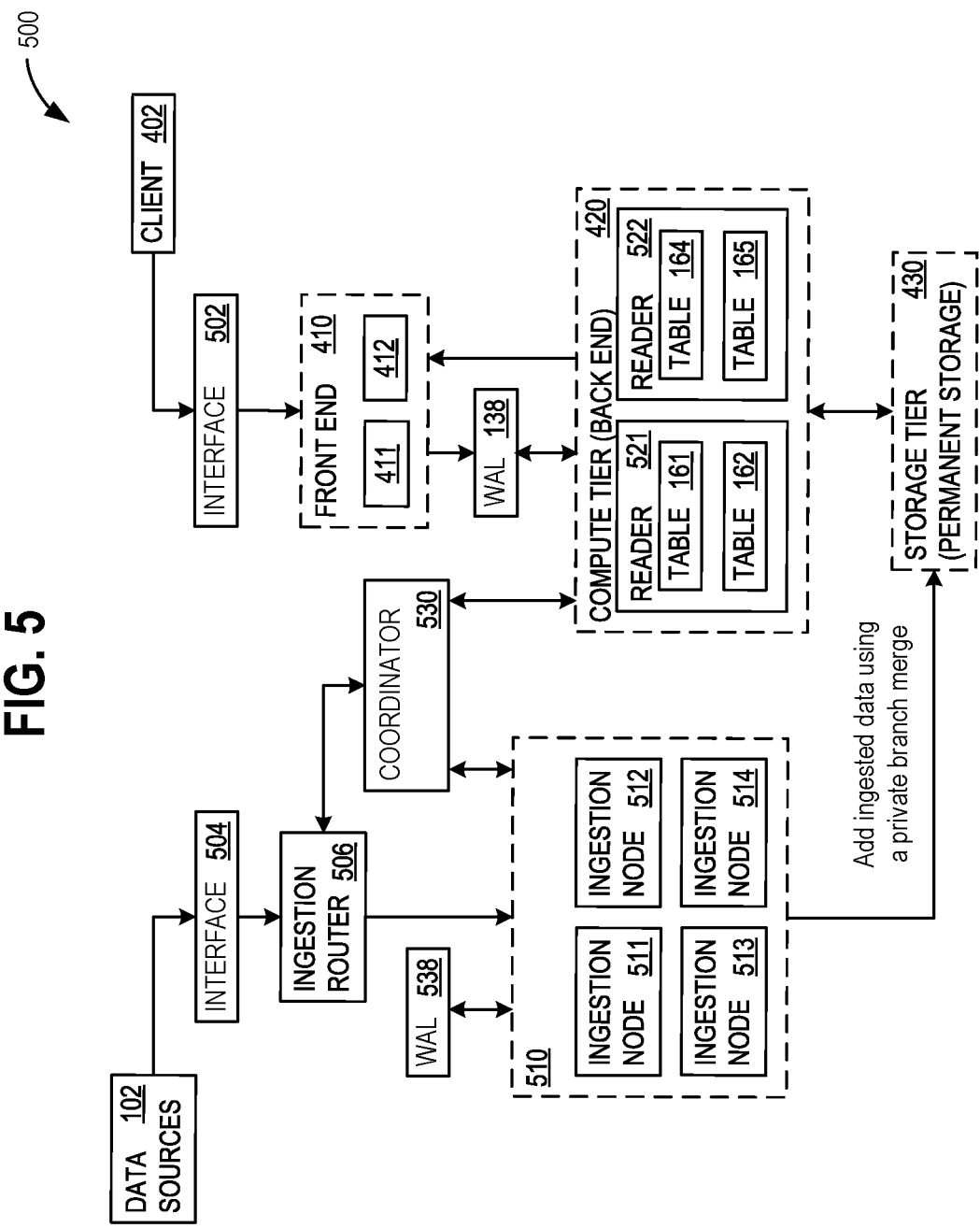
FIG. 5 illustrates an example architecture that facilitates optimizing references to changing data sets in distributed data lakes, and may be implemented as an extension to the architecture of FIG. 4.

FIG. 5 illustrates architecture 500 that facilitates optimizing references to changing data sets in distributed data lakes, and may be implemented as an extension to architecture 400. Architecture 500 separates ingestion, for example ingestion of high-volume streaming data, from more traditional read/write access, such as SQL transactions and other data queries using a set of ingestion nodes. An ingestion node is a logical node (e.g., a VM or a physical computing apparatus) that is tasked with receiving incoming messages, buffering them, and forwarding the messages to WAL 538. This arrangement advantageously permits scaling of ingestion, separately from traditional read/write access, to improve latency and throughput. In some examples, the number of ingestion nodes is flexible, growing and shrinking with the data ingestion load.

Snapshot isolation, which provides desirable properties for operation of architectures 100 and 400, may unfortunately work against latency targets. Architecture 500 improves latency by advantageously permitting the execution of queries on recently-ingested data prior to that data being finalized in permanent storage in the underlying tables. Because the underlying tables may be distributed differently, unexpected changes may occur while the query is being evaluated. Architecture 500 prevents data inconsistencies that may otherwise result from such uncertainties.

Architecture 500 uses at least two interfaces. An interface 502, which may be version control interface 110 described previously, or an adaption, provides ACID for data operations for client 402, enabling read and write operations for data in storage tier 430 and using at least workspace branches for transactions. Interface 502 is file-level read/write interface that allows an arbitrary number of files, belonging to arbitrary data tables, to be read and written as part of a transaction, while snapshot isolation is provided. In some examples, interface 502 also supports private branch transactions for data in storage tier 430. Another interface, interface 504, provides atomicity and durability, the A and D of ACID, for data ingestion from data sources 102. Interface 504 is a row-level, transaction ingestion interface. An ingestion transaction consists of ingestion messages, with each message containing a table path and some number of rows to be inserted to it.

The ingested data is added into master branch 200 in storage tier 430 using private branch transactions that merge in the new data. Architecture 500 implements optimizations for ingestion transactions that only add data. Such transactions require atomicity and durability, while the lack of read operations renders the need for isolation and consistency moot. Thus, architecture 500 is able to advantageously permit high-volume data ingestion, while minimizing latency for data visibility. For purposes of clarity in describing architecture 500, storage tier 430 is deemed "permanent storage" to differentiate from "temporary storage" where recently-ingested data is persisted while awaiting merging into a master branch 200—and from which client 402 is able to read the recently-ingested data. This temporary storage is comprised of a WAL 538 and/or buffers within ingestion nodes 511-514, and is described in further in reference to the following figures.

Also for purposes of clarity in describing architecture 500, the back end nodes (hosts 421 and 422) in compute tier 420 are identified as reader node 521 and reader node 522. A reader node is a logical node (e.g., a VM or a physical computing apparatus) through which client 402 is able to read data from compute tier 420. Although reader nodes 521 and 522 may be capable of both reading and writing data in storage tier 430 (permanent storage) the term "reader node" is used to more clearly differentiate from the write-only ingestion nodes (ingestion node 511, ingestion node 512, ingestion node 513, and ingestion node 514), and to emphasize the role of reader nodes 521 and 522 in permitting reading of recently-ingested data prior to its storage in storage tier 430 and merging into master branch 200.

Architecture 500 further includes an ingestion router 506 that routes data ingestion messages to a selected ingestion node in plurality of ingestion nodes 510, and a coordinator 530. Architecture 500 permits each ingestion node to optimize the granularity of its processing and persistence operations independently of the latency at which it makes its data available for reading. The operation of architecture 500 is described in further detail in the following figures.

Figure 6:
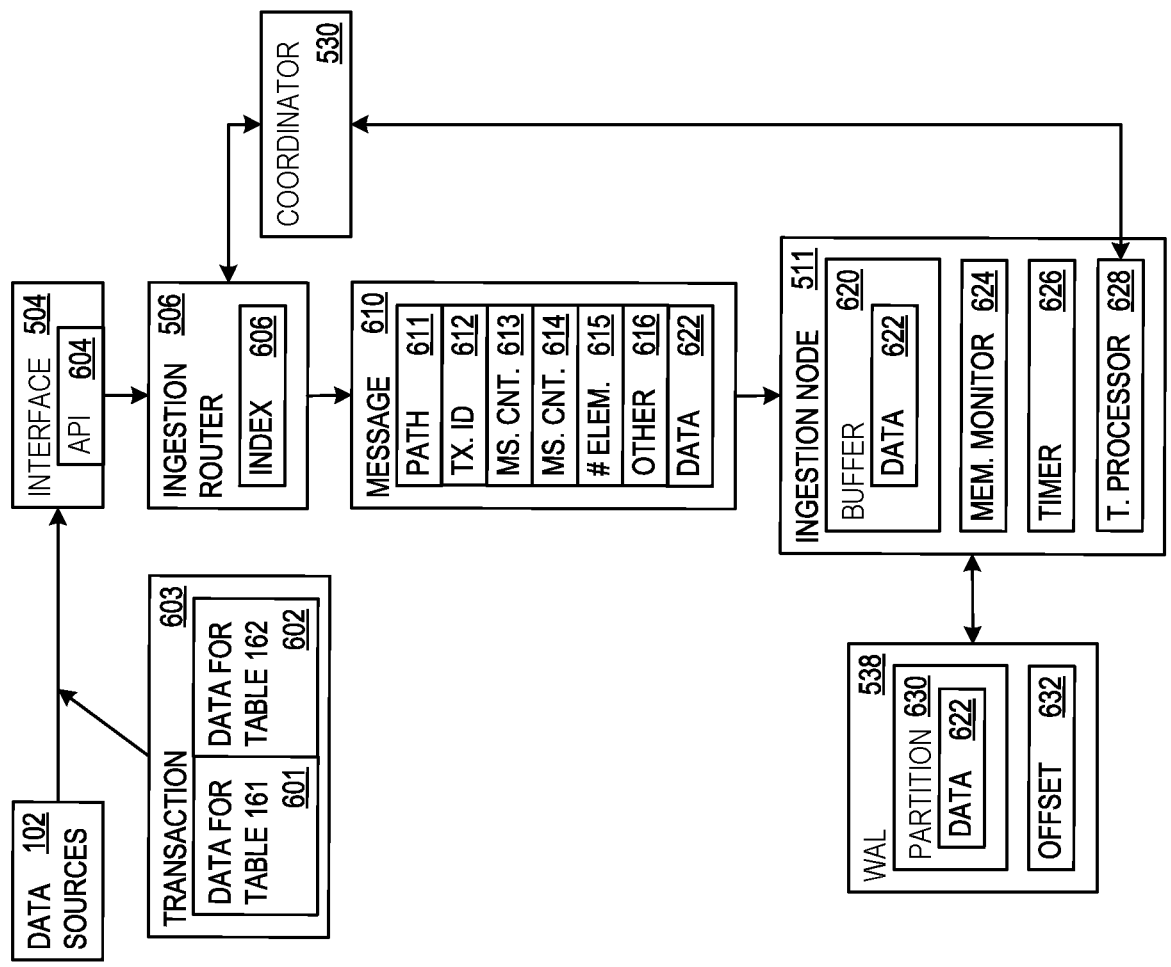
FIGS. 6-10 illustrate example flows of data and messages, as may occur when using examples of the disclosure such as the architecture of FIG. 5.

FIG. 6 illustrates the initial stages of an incoming flow of data in a transaction 603. Transaction 603 spans tables 161 and 162 and includes data 601 for table 161 and data 602 for table 162. Each ingestion node in architecture 500, such as ingestion node 511, in architecture 500 hosts a set of logical table processors, such as a logical table processor 628, and there is a coordinator 530 for each data group.

Each logical table processor is associated with the coordinator responsible for the data group of the table. Incoming ingestion messages are partitioned by table and thus routed to their corresponding table processor. In the illustrated example, logical table processor 628 is associated with coordinator 530. Coordinator 530 continually, on an ongoing basis, extracts the transactionally complete sub-set of all data currently being processed by ingestion nodes 511-514 and makes it available for reading by readers 521 and 522.

Logical table processor 628 stores incoming messages a buffer 620 in ingestion node 511, along with the transaction meta data contained in the messages, for example, the total number of tables included in the transaction and the total number of messages for a particular table in the transaction.

Data sources 102 use an API 604 available through interface 504 to send data ingestion messages (write requests), such as a message 610. Message 610 has data 622 and an indication of the table for which data 622 is to be added. In some examples, the indication of the table is illustrated as a path 611. In this example, data 622 is a portion of data 601, and thus path 611 points to table 161. Ingestion router 506 is routed to ingestion node 511, because ingestion node 511 handles data ingestion for table 161. To accomplish this, ingestion router 506 has an index 606 that correlates tables with ingestion nodes. In some examples, coordinator 530 provides index 606 and/or provides the functionality of ingestion router 506.

Message 610 is illustrated as also having a transaction ID 612 that identifies transaction 603, a count 613 of messages for the transaction, and a count 614 of messages for the transaction for the ingestion node 511. Count 614 is a subset of count 613, and may be added to message 610 by ingestion router 506. Message 610 also has a count 615 of the number of elements to be written to table 161, and other metadata 616, such as the total number of tables included in transaction 603.

When ingestion node 511 receives message 610, data 622 is persisted and/or added to previously-received data 622 that had been persisted by ingestion node 511 from a prior message. Ingestion node 511 forwards data 622 to WAL 538 to ensure durability (the D of ACID) for data 622. In some examples WAL 538 is co-located with WAL 138, but is a separate partition of WAL 138. In some examples, WAL 538 is separate from WAL 138. WAL 538 has multiple partitions for data and uses a persistent offset. As shown, WAL 538 stores data 622 in a partition 630 with an offset 632 (a WAL offset).

Ingestion node 511 has a buffer 620, which is a portion of memory in which data 622 is also persisted. Both buffer 620 and WAL 538 are temporary storage for data 622, until data 622 is persisted in permanent storage (storage tier 430). Ingestion node 511 also has a memory monitor 624 that monitors memory pressure for ingestion node 511 and a timer 626. Ingestion node 511 flushes data 622 to permanent storage under a memory pressure trigger, indicated by memory monitor 624, to avoid an expected excessive replay cost for WAL 538 (e.g., during recovery), or on a recurring timer event based on at least a latency requirement and indicated by timer 626 (e.g., after a certain time interval since the last flush has elapsed.

Figure 7:
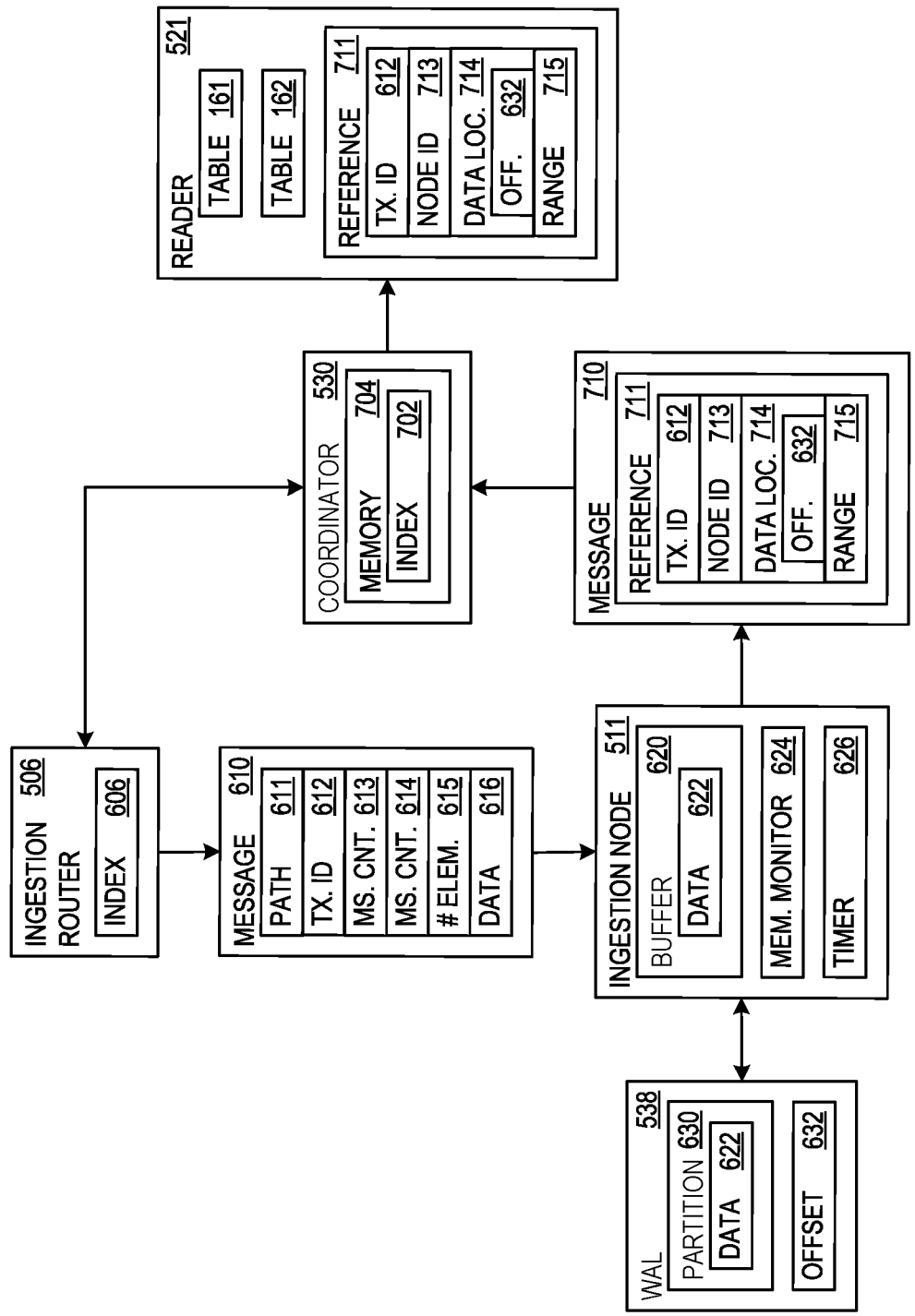

FIG. 7 illustrates the next stage of the incoming flow of data. Upon some trigger condition, such as a lapse of a timer (e.g., timer 626 or another timer), ingestion node 511 publishes a data available message 710 to reader node 521. This publishes the availability of the newly ingested data, and in some examples, occurs approximately every 30 seconds. In some examples, ingestion node 511 transmits data available message 710 to coordinator 530, which transmits data available message 710 to reader node 521. Coordinator 530 has an index 702 in its memory 704 that identifies, by table, which ingestion node(s) receive and persist the ingested data for the table, and which reader node owns the table (and thus receives the read requests for that table from client 402). In some examples, index 606 is derived from, or the same as, index 702.

Data available message 710 advertises the availability of data 622 for reading, and includes a reference 711 to data 622 and transaction ID 612. Reference 711 is a self-describing reference, rather than an opaque reference, to enable look up/retrieval of the data at a later time. Reference 711 includes indication 713 of ingestion node 511, location information 714 of data 622, and a range 715 of data 622. In some examples, location information 714 includes offset 632.

An example format for reference 711 is given by: <data-reference>::=<logical-node-address>":"<composite-data-range>; <composite-data-range>::=<data-range>|<data-range>, <composite-data-range>, <data-range>::=<start-offset>"-"<end-offset>, and is prefixed by a constant path. This provides reference persistence, such that a reference always resolves to the same data set, even in the following cases: (a) the node owning or referencing the data has crashed and is recovering or has recovered; (b) the system is scaling up or down and the set of ingestion nodes is changing; and (c) the reference is pointing to data to which more elements are being added. This scheme also provides data persistence and addressability, such that given a data reference, it is possible to retrieve a super-set of the data referenced by it, and extract the sub-set of data from it that exactly matches the reference.

Reference persistence guarantees that a reader node will be able to provide snapshot isolation while reading the ingestion node's data via a reference, and data persistence allows an ingestion node to provide reference persistence to reader nodes, as long as the ingestion node reliably stores some super-set of the references it has published. The use of reference 711 enables architecture 500 to supports transactions with snapshot isolation so that all the reads in the same transaction will return the same data, regardless of whether the data is stored locally or is instead stored in another node and only referenced. For example, reader node 521 can store reference 711 to data 622 stored in ingestion node 511. Reader node 521 is thus able to read a mix of data stored within any of reader node 521, within storage tier 430, and within ingestion node 511.

Figure 8:
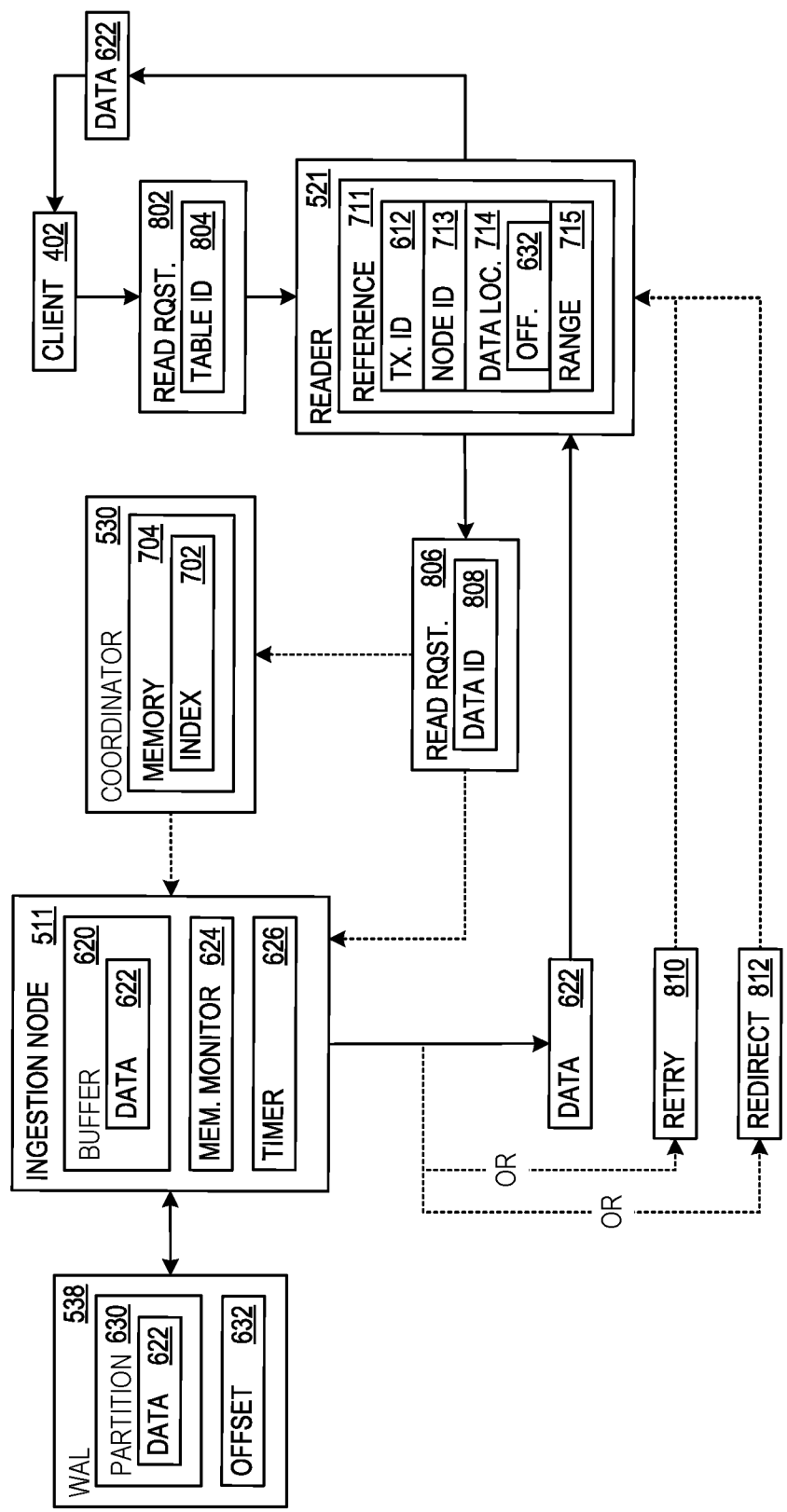

FIG. 8 illustrates data flow when client 402 performs a query that includes data 622, prior to data 622 having been persisted in permanent storage. An example is that client 402 sends a directory command to reader node 521, to list available files. Because reader node 521 had received message 710 and maintains snapshots and the directory tree, reader node 521 responds to client 402 by listing responsive files that have previously been persisted to permanent storage, and also responsive files that are included within data 622. Message 710 is available for reading because it has been matched against the other portions of transaction ID 612, and with all of the other portions having been found available (i.e., their data available message having been received by coordinator 530), they have collectively been merged into the master branch (along with data from other complete transactions).

In the scenario depicted in FIG. 8, client 402 transmits a read request 802, through interface 502 and front end 410 (See FIG. 5), to reader node 521. Read request 802 contains an indication 804 of table 161. Reader node 521 refers to reference 711, identifies that data 622 is available through ingestion node 511, and transmits read request 806 to ingestion node 511. Read request 806 has an identification 808 of data 622 that indicates location information 714 of data 622 and, in some examples, also a range of the data requested. In some examples, reader node 521 transmits read request 806 to ingestion node 511 directly, whereas, in some examples, reader node 521 transmits read request 806 to coordinator 530, which forwards read request 806 to ingestion node 511.

Ingestion node 511 responds in one of multiple ways. If ingestion node 511 is running properly, has data 622, and is not currently in a recovery, ingestion node 511 transmits data 622 to reader node 521. If ingestion node 511 is currently in a recovery, and has not yet recovered data 622, ingestion node 511 transmits a retry message 810 to reader node 521. If ingestion node 511 does not store data 622, but instead stores only a reference to data 622, ingestion node 511 transmits a redirect response 812 to reader node 521 that identifies the node to which reader node 521 should send a read request to retrieve data 622. Any of these messages from ingestion node 511 to reader node 521 may be routed through coordinator 530. Upon receiving data 622, reader node 521 sends data 622 to client 402 (e.g., using interface 502 of FIG. 5).

When the node that owns the data receives a read request based on redirect response 812, the corresponding data set may be determined in multiple ways: The same or larger data set may be located in the node's own memory (e.g., the buffer of that node). By matching the offset metadata in the in-memory data representation against the composite data range of the reference, the proper sub-set of data may be located. The same or larger data set may be located in storage tier 430. The same extraction as for in-memory data is performed. Due to a crash, the data may be neither (completely) in memory, nor in storage. It is still, however, in WAL 538 and may be extracted from it, separately or as part of the ongoing recovery process, using the identified offsets.

Figure 9:
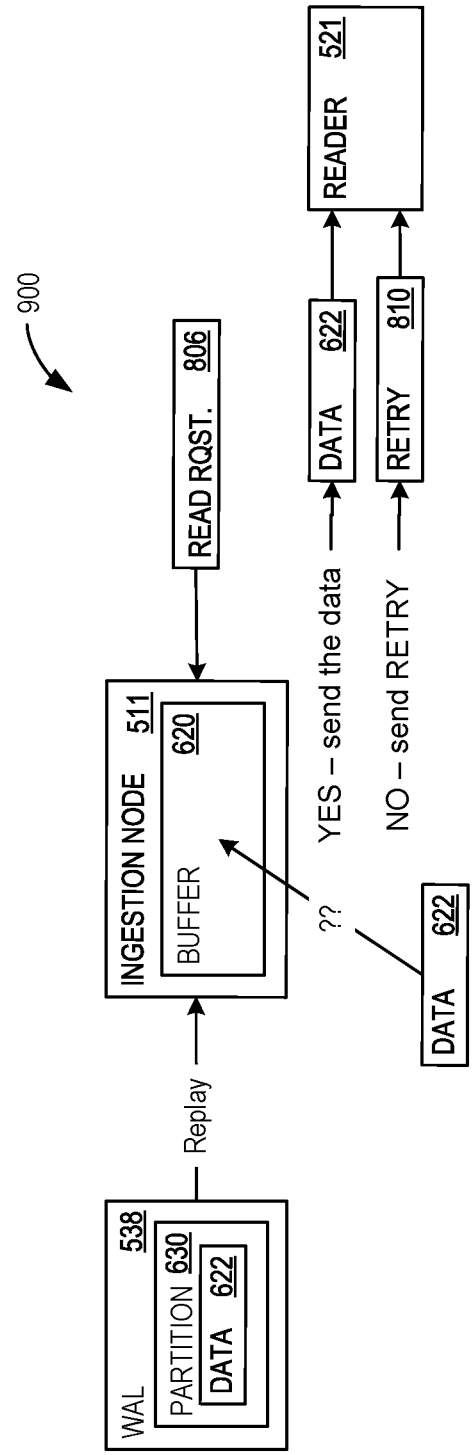

FIG. 9 illustrates data flow when client 402 performs a query that includes data 622, prior to data 622 having been persisted in permanent storage, while ingestion node 511 is currently in a recovery. Ingestion node 511 receives read request 806 while messages from WAL 538 are replaying. In response to receiving read request 806, ingestion node 511 determines whether data within the range of data 622 has been recovered to buffer 620, which is memory accessible by ingestion node 511. If so, ingestion node 511 transmits data 622 to reader node 521. Otherwise, ingestion node 511 may wait until data 622 has been recovered to buffer 620 and then transmit data 622 to reader node 521, or else transmit retry message 810 to reader node 521.

Figure 10:
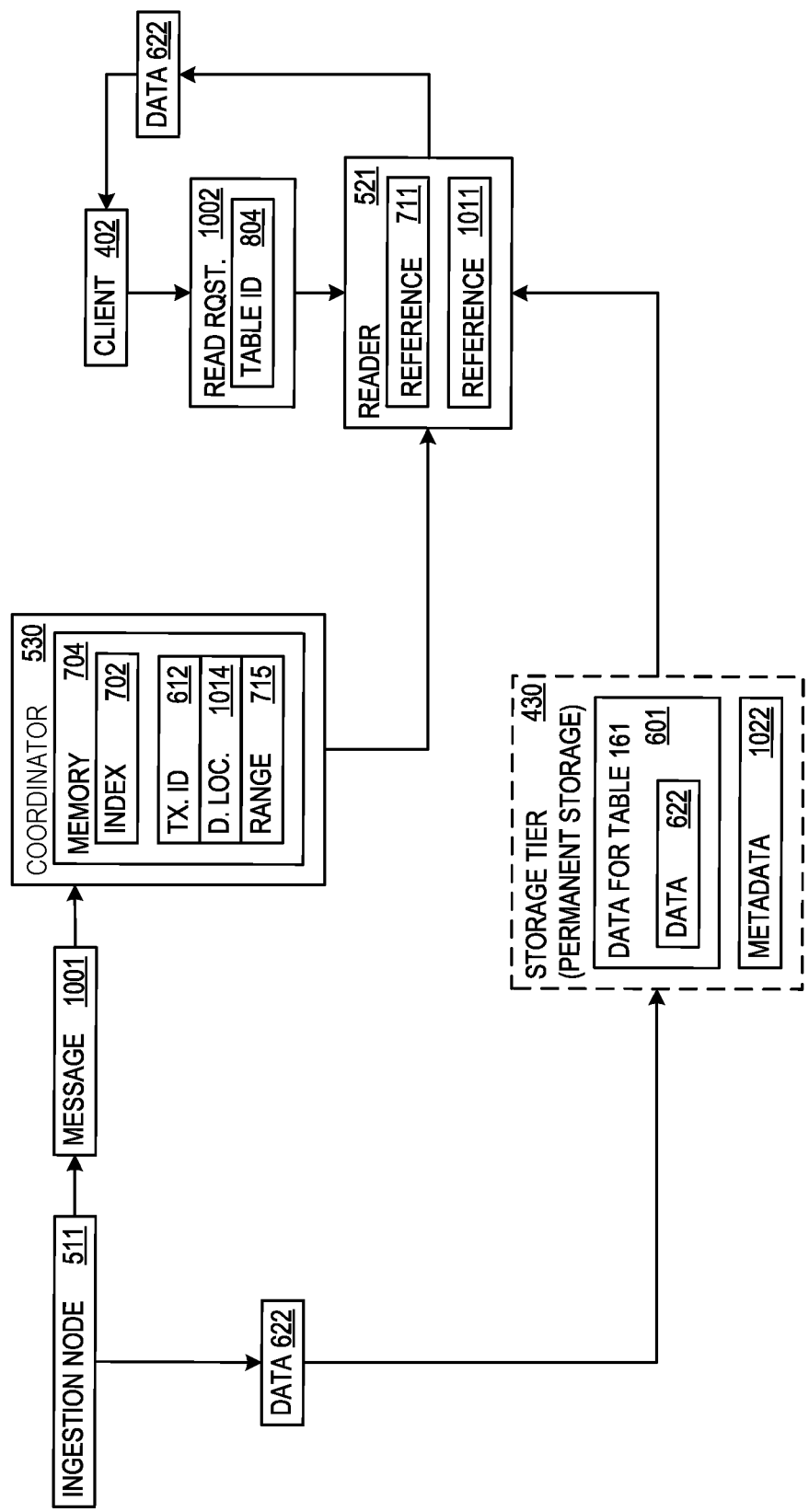

FIG. 10 illustrates data flow when client 402 performs a query that includes data 622, after data 622 has been flushed to permanent storage. Reference 711 is meant to be temporary, and used until data 622 has been persisted in storage tier 430 (e.g., persisted in permanent storage) and transaction 603 is complete. Reference 711 is then superseded by a permanent reference 1011, after ingestion node 511 persists data 622 in permanent storage and transmits a message 1001 to coordinator 530. Message 1001 includes transaction ID 612, a location 1014 of data 622 in storage tier 430, and range 715 of data 622. Coordinator 530 stores this in memory 704 and sends permanent reference 1011 to reader node 521 to supersede reference 711. Reader node 521 is able to retrieve data 622 from storage tier 430 to send to client 402. In addition to persisting data 622 in storage tier 430, ingestion node 511 also stores metadata 1022 for data 622 in storage tier 430. In some examples, metadata 1022 includes transaction ID 612 and range 715 of data 622.

Figure 11A:
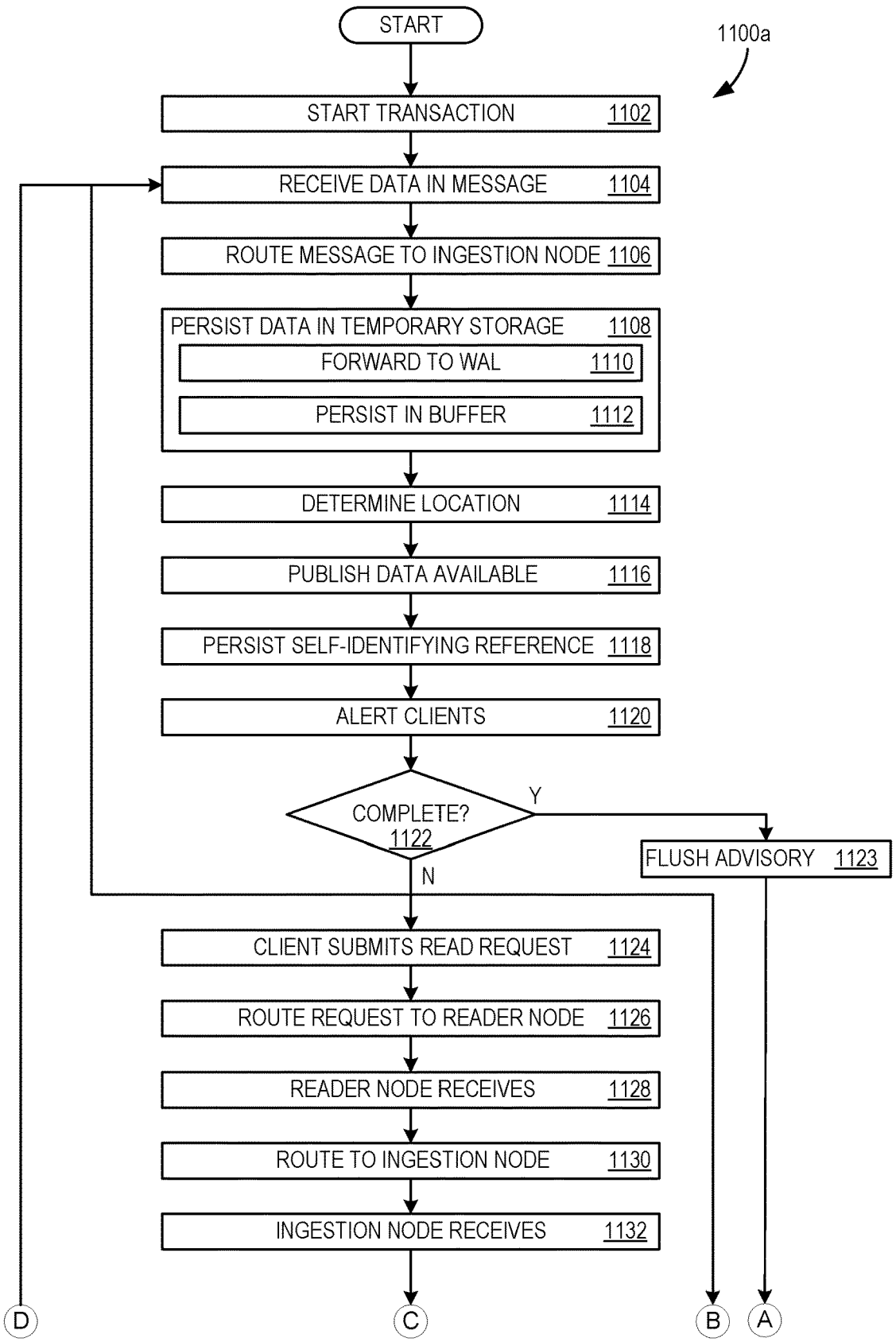
FIGS. 11A and 11B together illustrate a flowchart of exemplary operations associated with examples of the disclosure such as the architecture of FIG. 5 and the data flows of FIGS. 6-10.
Figure 11B:
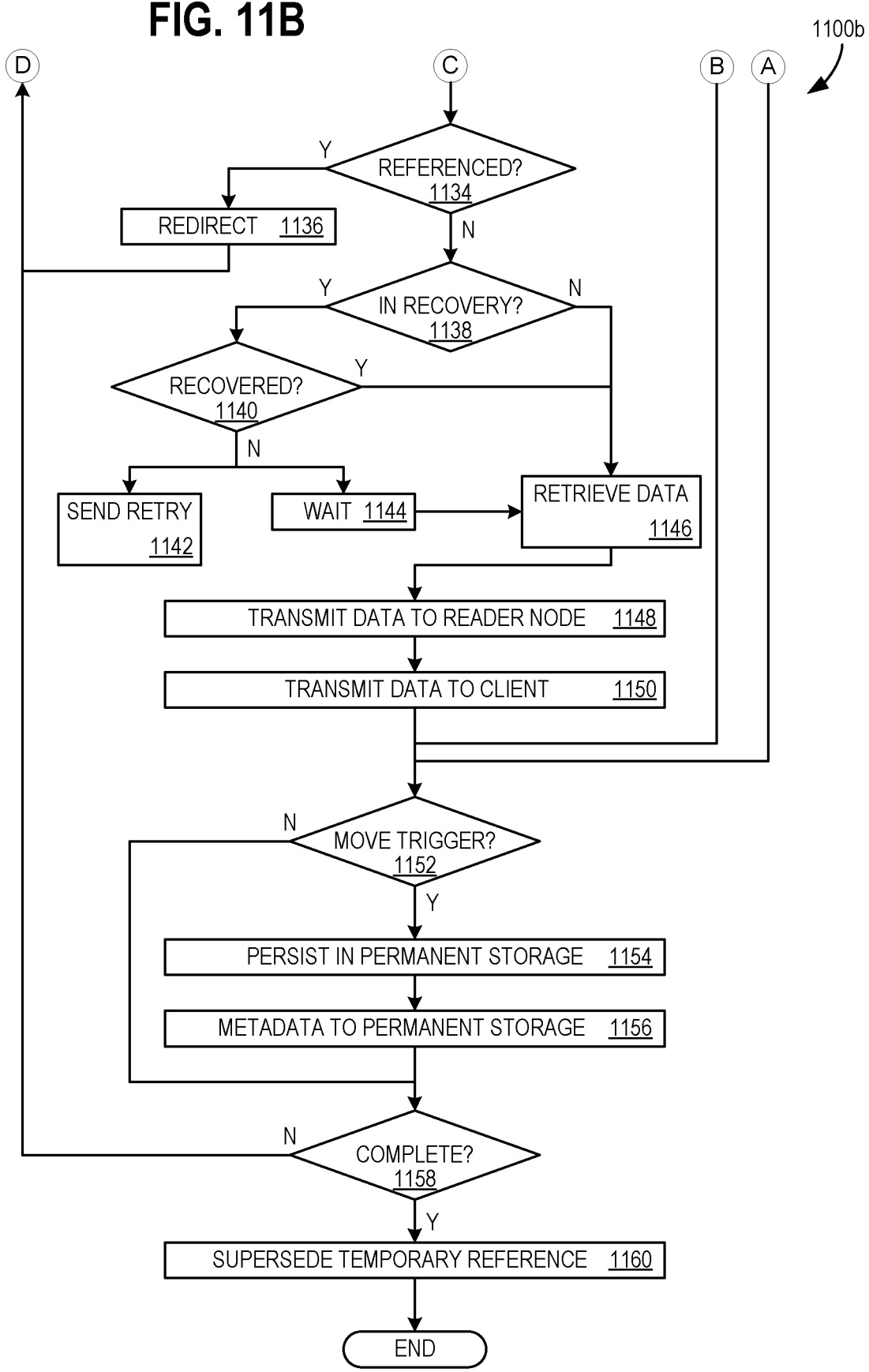

FIGS. 11A and 11B illustrates a flowchart in two parts, flowchart 1100a and 1100b, of exemplary operations associated with examples of architecture 500. In some examples, the operations of flowcharts 1100a and 1100b are performed by one or more computing apparatus 1700 of FIG. 17. Flowchart 1100a commences with the start of transaction 603 in operation 1102.

In operation 1104, ingestion router 506 receives, as part of transaction 603, an incoming write message, message 610, indicating table 161 and data 622 to be written to the table. In some examples, the indication of the table comprises indication of a path, for example path 611. In some examples, message 610 further indicates transaction ID 612. In some examples, message 610 further indicates a number of elements, objects, or rows to be written, such as count 615. In operation 1106, based on at least the table, ingestion router 506 routes message 610 to ingestion node 511 of plurality of ingestion nodes 510.

Operation 1108 persists data 622 in temporary storage, either in operation 1110, which includes forwarding, by ingestion node 511, data 622 to WAL 538, and/or in operation 1112, which includes persisting data 622 in buffer 620 of ingestion node 511. In operation 1114, ingestion node 511 determines location information of persisted data 622, such as an offset (e.g., a WAL offset).

In operation 1116, ingestion node 511 publishes, to reader node 521, data available message 710 comprising self-describing reference 711 to data 622. Reference 711 indicates ingestion node 511, location information of data 622, and range 715 of data 622. In some examples, message 710 further indicates transaction ID 612 (identifying transaction 603), possibly within reference 711. In some examples, publishing the data available message occurs on a trigger condition that comprises a recurring timer event, which is based on at least a latency requirement for making recently-ingested data available for reading. Reader node 521 persists at least a portion of reference 711 to data 622 in operation 1118, and alerts client 402 and possibly other clients of the availability of data 622 in operation 1120.

Decision operation 1122 determines whether transaction 603 is complete. After coordinator 530 consolidates references it has received, it is able to determine whether transaction 603 is complete. If so, in operation 1123, coordinator 530 sends a flush advisory message to all ingestion nodes, indicating a watermark offset up through which all transactions are complete. The ingestion nodes may use this flush advisory as one of the possible triggers to write data to permanent storage for decision operation 1152 below, with the range of data being written corresponding to the offset range of the flush advisory message. Flowchart 1100a then moves to decision operation 1152 in flowchart 1100b. Otherwise, flowchart 1100a moves, in parallel, back to operation 1104 to receive further incoming write messages, on to operation 1124, in which client 402 submits read request 802, and also to decision operation 1152 in flowchart 1100b.

Read request 802 is routed to reader node 521, either directly or through coordinator 530, in operation 1126, based on at least read request indicating table 161. Reader node 521 is the node that owns table 161 and receives read request 802 for data within the range of data 622 from client 402, in operation 1128. In operation 1130, reader node 521 routes read request 806 to ingestion node 511, based on at least reference 711 to data 622. Read request 806 indicates the location information of data 622 in WAL 538. Because reference 711 indicates ingestion node 511, ingestion node 511 receives read request 806 from reader node 521, either directly or through coordinator 530, in operation 1132.

Moving now to flowchart 1100b, decision operation 1134 determines whether ingestion node 511 has the data identified in read request 806. If not then, based on at least ingestion node 511 not having the data identified in read request 806, ingestion node returns redirect response 812 in operation 1136. Flowchart 1100b then returns to operation 1104 in flowchart 1100a to continue receiving incoming write messages. In some examples, redirect response 812 comprises a self-describing reference, similar to reference 711, to the data identified in read request 806.

If ingestion node 511 does have the data, then decision operation 1138 determines whether ingestion node 511 is still in a recovery. If so, decision operation 1140 determines whether the data within the range of data 622 has been recovered to a memory accessible by ingestion node 511. If that data has not yet been recovered, then ingestion node 511 responds to reader node 521 with retry message 810, in operation 1142. Alternatively, ingestion node 511 waits until the data within the range of data 622 has been recovered, in operation 1144, and then proceeds to operation 1146 to retrieve the data within the range of data 622.

Flowchart 1100*b* also reaches operation 1146 if decision operation 1140 determines that the data within the range of data 622 has been recovered to a memory accessible by ingestion node 511, or decision operation 1138 determines that ingestion node 511 is not still in a recovery. In operation 1148 ingestion node 511 transmits the data retrieved during operation 1146 to reader node 521, and reader node 521 transmits the data to client 402 in operation 1150.

Flowchart 1100*b* reaches decision operation 1152 either from operation 1150, or from either result of decision operation 1122. Decision operation 1152 determines whether a trigger condition for persisting data 622 in permanent storage has occurred. The trigger condition may be the completion of transaction 603, the lapse of a timer (e.g., timer 626), or memory pressure indicated by memory monitor 624. If decision operation 1152 results in a "move" indication, operation 1154 persists data 622 in permanent storage (storage tier 430), and operation 1156 persists an indication of ingestion node 511, the location information of data 622 in WAL 538, and a range of data 622 as metadata for data 622.

Decision operation 1158 revisits whether transaction 603 is complete. If not, flowchart 1100*b* returns to operation 1104 in flowchart 1100*a* to continue receiving incoming write messages. If transaction 603 is complete, however, operation 1160 supersedes reference 711 to data 622 with a permanent reference 1011 to data 622 in the permanent storage.

Figure 12:
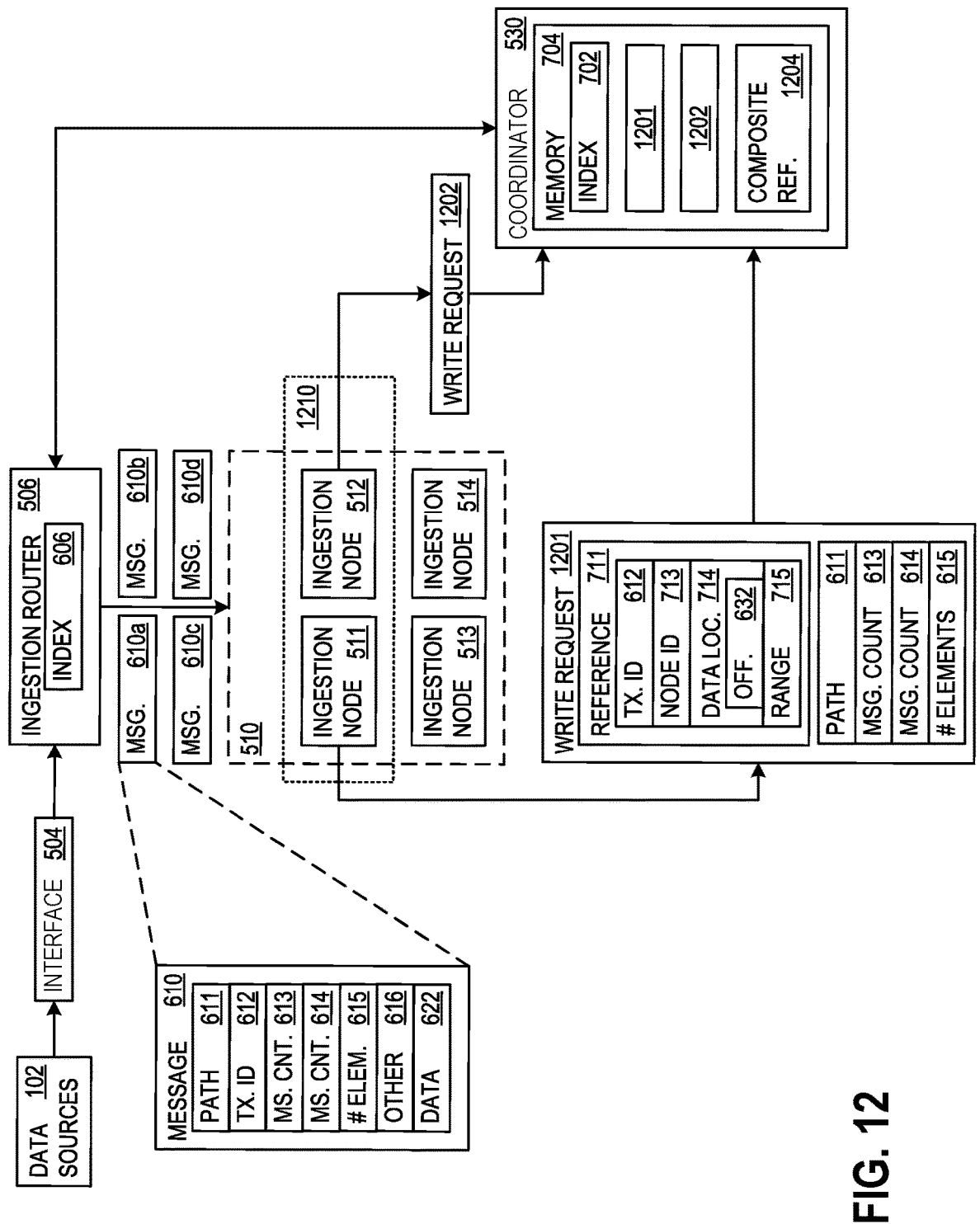
FIGS. 12-14 illustrate additional example flows of data and messages for distributed appending transactions in data lakes, as may occur when using examples of the disclosure such as the architecture of FIG. 5.
Figure 13:
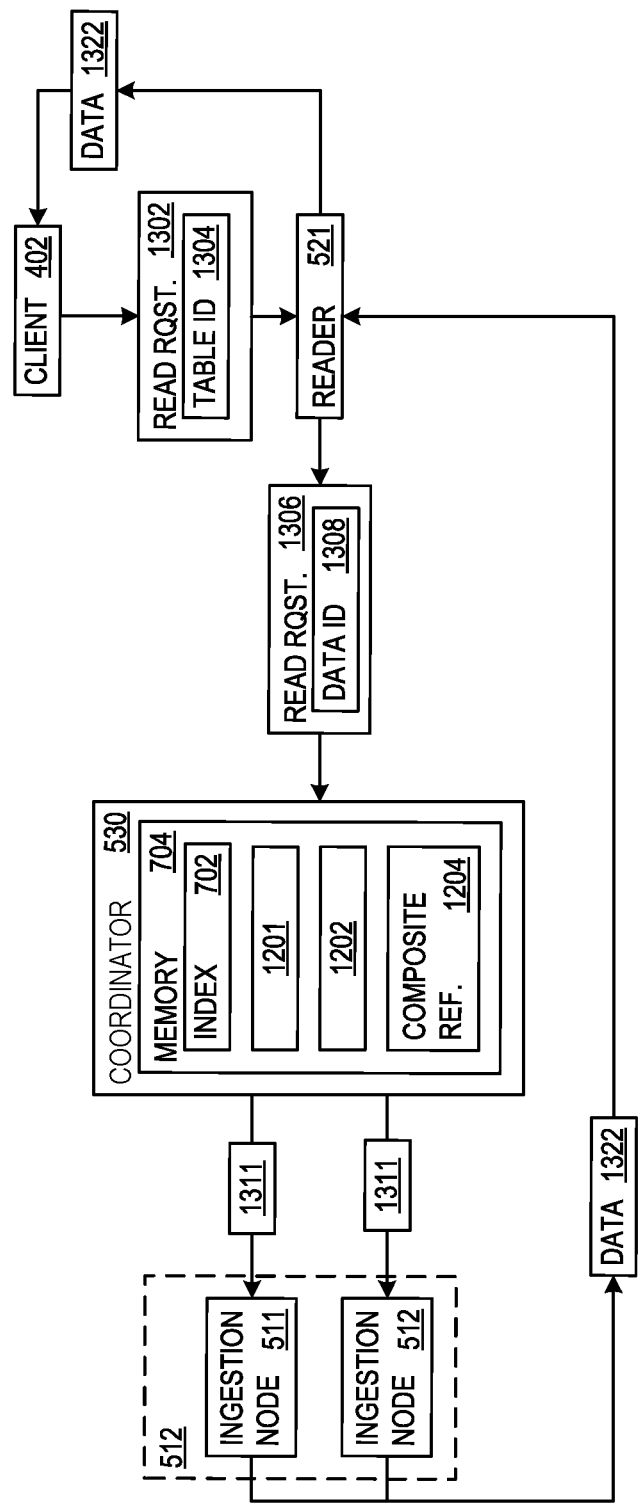
Figure 14:
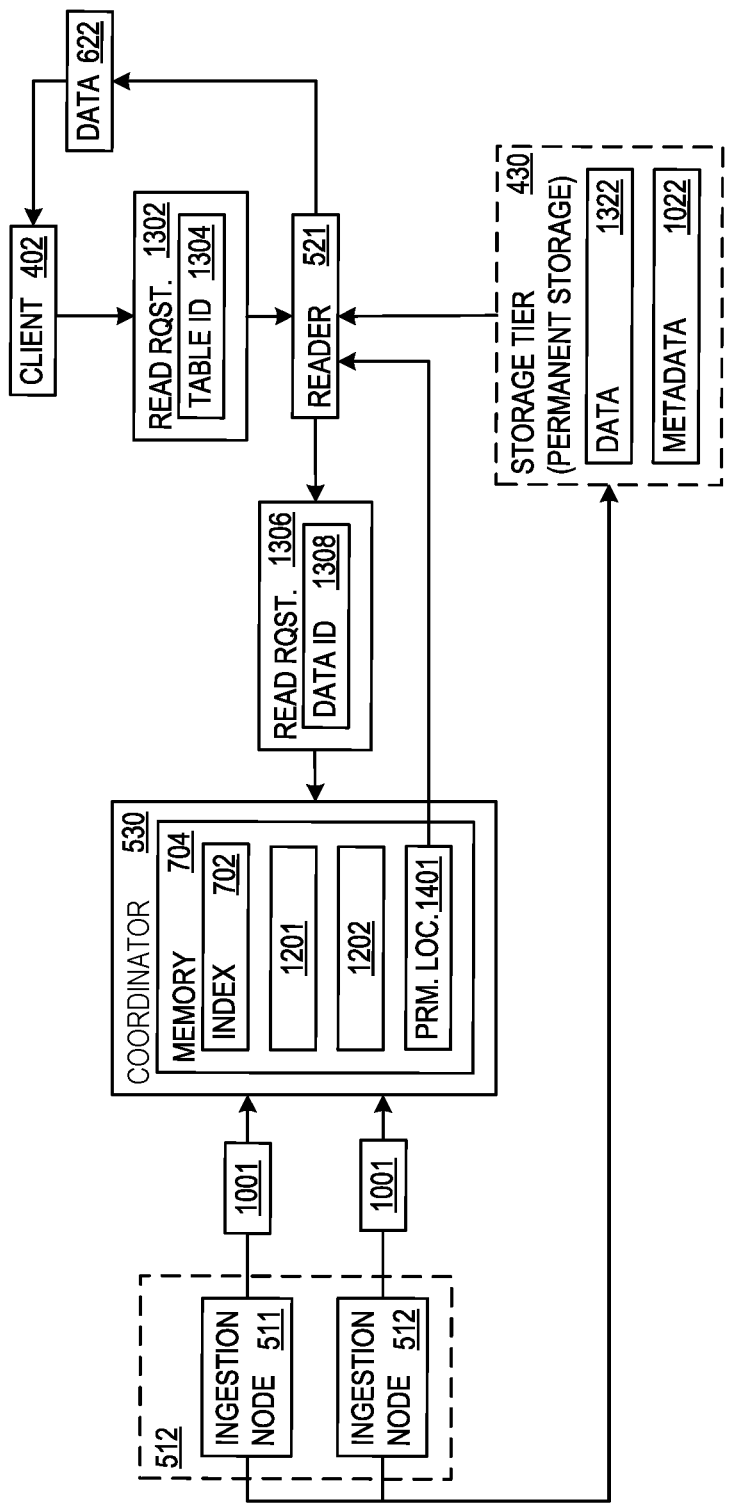

FIGS. 12-14 illustrate flows of data and messages in architecture 500 for a scenario in which multiple ingestion nodes ingest data for a single, multi-table transaction, with each ingestion node handling messages for a single table. For example, ingestion node 511 handles incoming data for table 161 and ingestion node 512 handles incoming data for table 162 (see also FIGS. 5 and 6). Messages 610*a* and 610*c* are instances of message 610 and have data for table 161. Messages 610*b* and 610*d* are also instances of message 610 and have data for table 162. Ingestion router 506 uses index 606 and references path 611 in each incoming message in order to partition the plurality of messages 610*a*-610*d* and route messages 610*a* and 610*c* to ingestion node 511 and route messages 610*b* and 610*d* to ingestion node 512. Together, ingestion node 511 and ingestion node 512 form a set of ingestion nodes 1210 that are receiving messages and data for the transaction.

Routing all messages for a particular table to the same ingestion node allows creation of a smaller number of larger files for that table (path), whereas using different ingestion nodes for a single multi-table transaction increases data ingestion bandwidth. Because different ingestion nodes process different parts of the transaction, there is a need to identify when all messages for that transaction have arrived.

Ingestion node 511 determines count 614 of messages for the transaction (e.g., transaction 603) for the ingestion node 511, which may be as simple as reading count 614 from either of messages 610*a* or 610*c*, or may involve further processing and calculation. Similarly, ingestion node 512 determines count 614 of messages for the transaction for the ingestion node 512. Although the illustrated example has count 614 equal to 2 for both ingestion nodes 511 and 512, it should be understood that count 614 may differ for different ingestion nodes, and the value may be much higher.

Upon ingestion node 511 determining that it has received a complete set of messages for the transaction, such as by the received number of messages equaling count 614 for ingestion node 511, ingestion node 511 transmits a metadata write request 1201 to coordinator 530. Similarly, upon ingestion node 512 determining that it has received a complete set of messages for the transaction, ingestion node 512 transmits a metadata write request 1202, which has corresponding fields and values as metadata write request 1201, to coordinator 530.

Each ingestion node passes transaction metadata (transaction IDs and ranges being submitted) to reader node 521 (as shown in FIG. 13) using the metadata write requests 1201 and 1202 to coordinator 530. Metadata write requests 1201 and 1202 each have ingestion transaction metadata, including transaction ID 612, count 613, count 614, and count 615. Table/partition identification/path information is also included, shown as path 611. Some examples include reference 711 or an equivalent reference that includes a persistent reference to the location of the data, including identification of the ingestion node, offset 632, and range 715. In some examples, ingestion nodes 511 and 512 each store process state information (e.g., message consumption offsets) alongside the references, under a path specific to the ingestion node, in order to transactionally tie this information with the submission of data visibility. After the metadata write operation (the metadata write request 1201 or 1202) to coordinator 530 succeeds, the ingestion node amends its buffer 620 with the reference (e.g., reference 711) under which the data has been made visible. This is used to exclude the same data from future synchronization, as well as when writing data to permanent storage.

Coordinator 530 collects metadata write requests 1201 and 1202 from set of ingestion nodes 1210 and consolidates the reference information contained in those write requests into a composite reference 1204 for the data that is visible for the transaction.

FIG. 13 illustrates a scenario in which reader node 521 receives a read request 1302 for data in the transaction, while the requested data is still in the ingestion nodes. Read request 1302 from client 402 is routed to reader node 521 based on table ID 804 identifying tables 161 and 162, which are owned by reader node 521. Reader node 521 sends a read request 1306 to coordinator 530 that includes identification 808 of the data requested. Coordinator 530 uses composite reference 1204 to identify that the data spans ingestion nodes 511 and 512 and so sends read request 1311 to ingestion node 511 and read request 1312 to ingestion node 512.

Ingestion nodes 511 and 512 each send their respective portions of the requested data, together data 1322, to reader node 521. In some examples, ingestion nodes 511 and 512 each send their respective portions of the requested data to coordinator 530, which compiles it into data 1322. Reader node 521 sends data 1322 to client 402.

FIG. 14 illustrates a scenario in which reader node 521 receives read request 1302 for data in the transaction, but after the requested data has been persisted in permanent storage (storage tier 430). To limit recovery time the amount of data in WAL 538, ingestion nodes flush data to permanent storage on triggers, such as a timer. To avoid read requests for flushed data to be unnecessarily routed from coordinator 530 to an ingestion node, and then to permanent storage, composite reference 1204 will be superseded. This may be accomplished asynchronously and non-transactionally.

After ingestion node 511 persists its data and the metadata for its portion of the transaction in permanent storage, it sends a message 1001 to coordinator 530, as described in relation to FIG. 10. Ingestion node 512 does the same. Coordinator 530 replaces composite reference 1204 with a permanent reference 1401 to the data, indicating the location of the data in storage tier 430. When reader node 521 sends read request 1306 to coordinator 530, coordinator 530 returns permanent reference 1401. Reader node 521 uses permanent reference 1401 to serve read request 1302 from permanent storage.

Figure 15A:
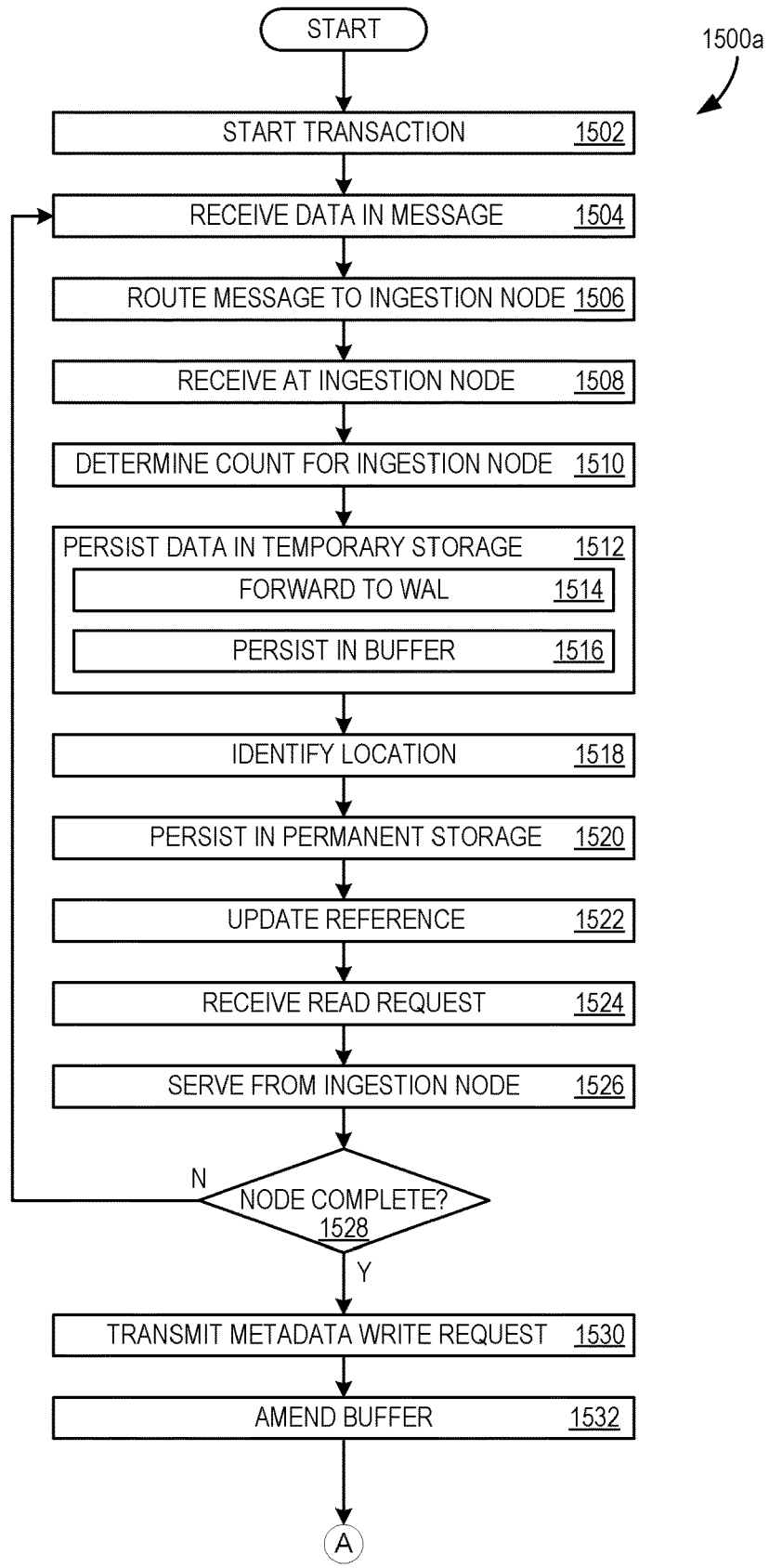
FIGS. 15A and 15B together illustrate a flowchart of exemplary operations associated with examples of the disclosure such as the architecture of FIG. 5 and the data flows of FIGS. 12-14.
Figure 15B:
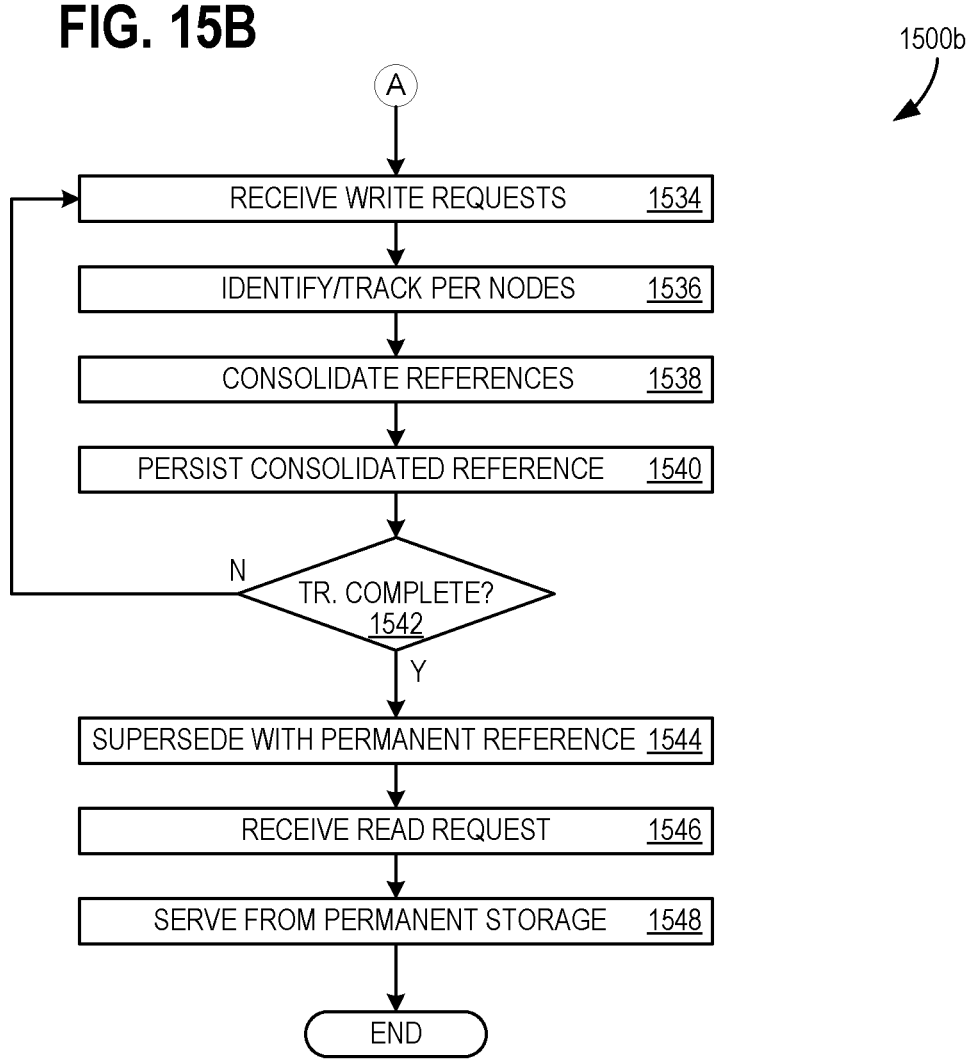

FIGS. 15A and 15B illustrates a flowchart in two parts, flowchart 1500a and 1500b, of exemplary operations associated with examples of architecture 500. In some examples, the operations of flowcharts 1500a and 1500b are performed by one or more computing apparatus 1700 of FIG. 17. Flowchart 1500a commences with the start of transaction 603 in operation 1502.

In operation 1504, ingestion router 506 receives, as part of transaction 603, incoming write messages 610a-610d, indicating tables 161 and 162, and data to be written to the tables. In some examples, the indication of the table comprises indication of a path, for example path 611. In some examples, messages 610a-610d further indicate transaction ID 612. In some examples, messages 610a-610d further indicate a number of elements, objects, or rows to be written, such as count 615. In operation 1506, ingestion router 506 partitions messages 610a-610d for the transaction among plurality of ingestion nodes 1210. This partitioning assigns and routes message 610a to ingestion node 511.

Ingestion node 511 receives message 610a as part of the transaction. Message 610a indicates transaction ID 612, count 613 of messages for the transaction, and data 622, which is a portion of the data for the transaction, in operation 1508. In operation 1510, ingestion node 511 determines count 614 of messages for the transaction for ingestion node 511. Operation 1512 persists data 622 in temporary storage, either in operation 1514, which includes forwarding, by ingestion node 511, data 622 to WAL 538, and/or in operation 1516, which includes persisting data 622 in buffer 620 of ingestion node 511. In operation 1518, ingestion node 511 determines location information of persisted data 622, such as an offset (e.g., a WAL offset), and identifies, to coordinator 530, location information 714 and range 715 for the persisted data of message 610a. In operation 1520, ingestion node 511 persists data 522 of message 610a in permanent storage (storage tier 430).

Coordinator 530 updates its reference to the persisted data, in operation 1522. With this process, coordinator 530 identifies, on an ongoing basis, a transactionally complete sub-set of data being processed by ingestion node 511 (and other ingestion nodes 512-514, in some examples) and makes the transactionally complete sub-set of data available for reading by reader 521 (and reader 522, in some examples).

Client 402 submits read request 1302, and read request 1302 is received by reader node 521, which forwards read request 1306 to coordinator 530, in operation 1524. Coordinator 530 routes (at least a portion of) read request 1306 for the data of message to ingestion node 511 as read request 1311. In operation 1526, ingestion node 511 sends the data to reader node 521, thereby serving the read request from ingestion node 511. Decision operation 1528 determines whether ingestion node 511 has received the complete set of messages for its portion of transaction 603. This may be determined using count 614. This determines whether transaction 603 is complete for ingestion node 511, although other ingestion nodes may still be awaiting messages (e.g., ingestion node 512 may still be awaiting message 610d). If not, flowchart 1100a returns to operation 1504 to continue receiving incoming write messages. Otherwise, if transaction 603 is complete for ingestion node 511, flowchart 1100a moves on to operation 1530.

In operation 1530, ingestion node 511 transmits metadata write request 1201 to coordinator 530 and, in operation 1532, amends buffer 620 with reference 711, the reference under which data 622 has been made visible. Coordinator 530 receives metadata write request 1201 from ingestion node 511 in operation 1534, along with metadata write requests from other ingestion nodes receiving data in the transaction (e.g., metadata write request 1202 from ingestion node 522). In operation 1536, coordinator 530 identifies the metadata write requests from set of ingestion nodes 1210, and consolidates the references of the metadata write requests into composite reference 1204, in operation 1538. Composite reference 1204 is persisted in operation 1540.

Decision operation 1542 determines whether the transaction is complete. Coordinator 530 may make this determination based on all ingestion nodes that are involved in the transaction each reporting their own portions to be complete. Coordinator 530 may check for this condition after receipt of each metadata write request, and/or some other trigger condition. If the transaction is incomplete, flowchart 1500b returns to operation 1534 to continue receiving metadata write requests from other nodes. Otherwise, if the transaction is complete, the temporary reference to the data (e.g., composite reference 1204 is superseded by permanent reference 1401, in operation 1544.

Client 402 submits read request 1302, and read request 1302 is received by reader node 521, which forwards read request 1306 to coordinator 530, in operation 1546. Because coordinator 530 receives read request 1306 in operation 1546 after persisting composite reference 1204 (which occurred in operation 1540), coordinator 530 returns permanent reference 1401 to reader node 521 and does not route the read request to ingestion node 511.

Figure 16:
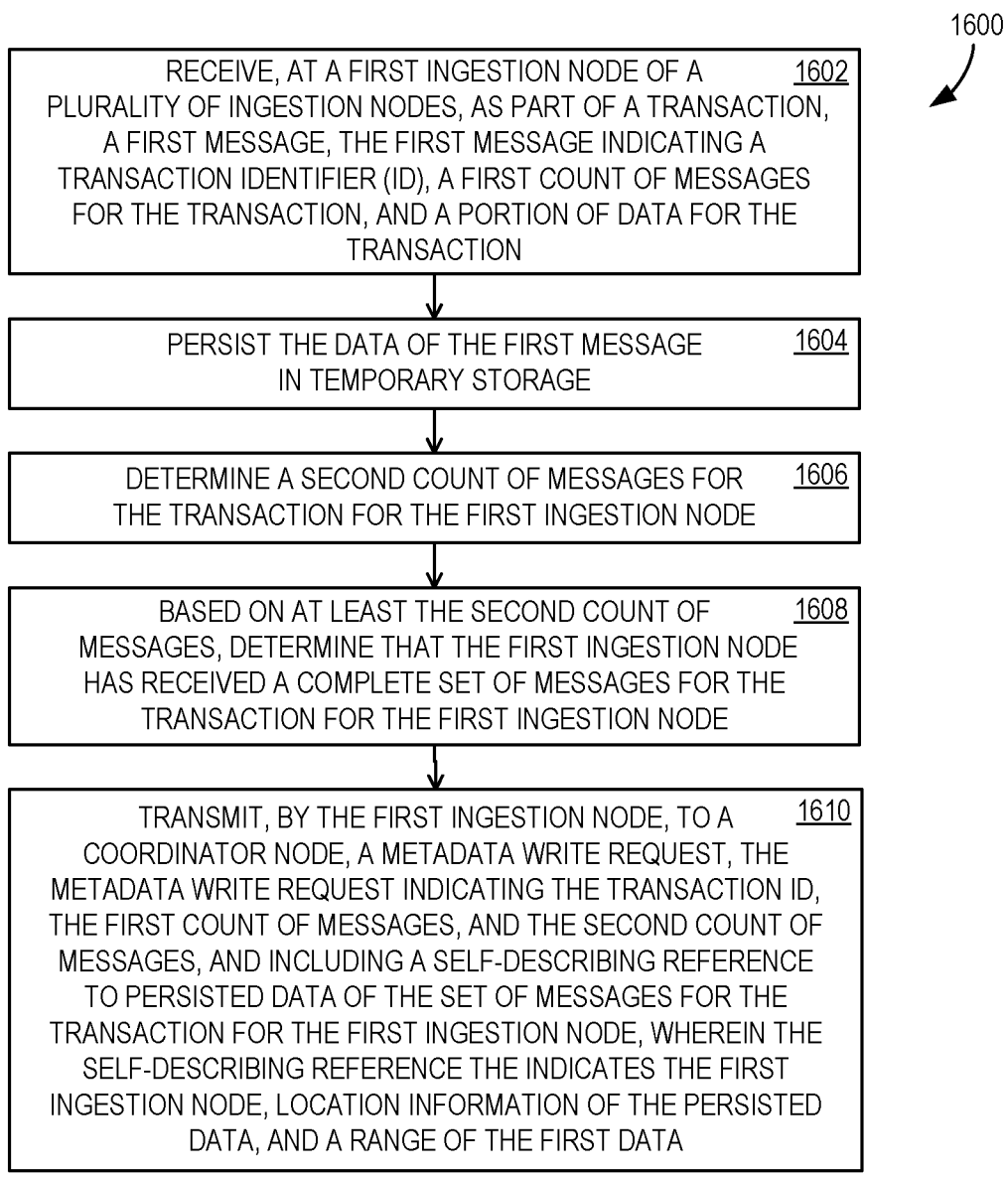
FIG. 16 illustrates another flowchart of exemplary operations associated with examples of the disclosure such as the architecture of FIG. 1.

FIG. 16 illustrates a flowchart 1600 of exemplary operations that are associated with architecture 500. In some examples, the operations of flowchart 1600 are performed by one or more computing apparatus 1700 of FIG. 17. Flowchart 1600 commences with operation 1602, which includes receiving, at a first ingestion node of a plurality of ingestion nodes, as part of a transaction, a first message, the first message indicating a transaction ID, a first count of messages for the transaction, and a portion of data for the transaction.

Operation 1604 includes persisting the data of the first message in temporary storage. Operation 1606 includes determining a second count of messages for the transaction for the first ingestion node. Operation 1608 includes, based on at least the second count of messages, determining that the first ingestion node has received a complete set of messages for the transaction for the first ingestion node. Operation 1610 includes transmitting, by the first ingestion node, to a coordinator, a metadata write request, the metadata write request indicating the transaction ID, the first count of messages, and the second count of messages, and including a self-describing reference to persisted data of the set of messages for the transaction for the first ingestion node, wherein the self-describing reference indicates the first ingestion node, location information of the persisted data, and a range of the first data.

Additional Examples

An example method comprises: receiving, at a first ingestion node of a plurality of ingestion nodes, as part of a transaction, a first message, the first message indicating a transaction ID, a first count of messages for the transaction, and a portion of data for the transaction; persisting the data of the first message in temporary storage; determining a second count of messages for the transaction for the first ingestion node; based on at least the second count of messages, determining that the first ingestion node has received a complete set of messages for the transaction for the first ingestion node; and transmitting, by the first ingestion node, to a coordinator, a metadata write request, the metadata write request indicating the transaction ID, the first count of messages, and the second count of messages, and including a self-describing reference to persisted data of the set of messages for the transaction for the first ingestion node, wherein the self-describing reference indicates the first ingestion node, location information of the persisted data, and a range of the first data.

An example computer system comprises: a processor; and a non-transitory computer readable medium having stored thereon program code executable by the processor, the program code causing the processor to: receive, at a first ingestion node of a plurality of ingestion nodes, as part of a transaction, a first message, the first message indicating a transaction ID, a first count of messages for the transaction, and a portion of data for the transaction; persist the data of the first message in temporary storage; determine a second count of messages for the transaction for the first ingestion node; based on at least the second count of messages, determine that the first ingestion node has received a complete set of messages for the transaction for the first ingestion node; and transmit, by the first ingestion node, to a coordinator, a metadata write request, the metadata write request indicating the transaction ID, the first count of messages, and the second count of messages, and including a self-describing reference to persisted data of the set of messages for the transaction for the first ingestion node, wherein the self-describing reference indicates the first ingestion node, location information of the persisted data, and a range of the first data.

An example non-transitory computer storage medium has stored thereon program code executable by a processor, the program code embodying a method comprising: receiving, at a first ingestion node of a plurality of ingestion nodes, as part of a transaction, a first message, the first message indicating a transaction ID, a first count of messages for the transaction, and a portion of data for the transaction; persisting the data of the first message in temporary storage; determining a second count of messages for the transaction for the first ingestion node; based on at least the second count of messages, determining that the first ingestion node has received a complete set of messages for the transaction for the first ingestion node; and transmitting, by the first ingestion node, to a coordinator, a metadata write request, the metadata write request indicating the transaction ID, the first count of messages, and the second count of messages, and including a self-describing reference to persisted data of the set of messages for the transaction for the first ingestion node, wherein the self-describing reference indicates the first ingestion node, location information of the persisted data, and a range of the first data.

Alternatively, or in addition to the other examples described herein, examples include any combination of the following:
  identifying, by the coordinator, metadata write requests from a set of ingestion nodes of the plurality of ingestion nodes, the metadata write requests each including the transaction ID and a reference to persisted data, the set of ingestion nodes including the first ingestion node;
  determining that the transaction is complete;
  consolidating the references of the metadata write requests into a composite reference;
  persisting the composite reference;
  after consolidating references, transmitting, by the coordinator, a flush advisory to the first ingestion node;
  the flush advisory comprises a trigger for persisting the data of the first message in a permanent storage;
  persisting the data of the first message in a permanent storage;
  identifying, to the coordinator, location information and a range for the persisted data of the first message;
  partitioning messages for the transaction among the plurality of ingestion nodes, wherein the partitioning comprises assigning the first message to the first ingestion node;
  the first message further indicates the second count of messages;
  receiving, by the coordinator, the metadata write request from the first ingestion node;
  receiving, by the coordinator, metadata write requests from others of the set of ingestion nodes;
  the temporary storage comprises a WAL;
  the location information of the persisted data comprises an offset;
  the location information of the persisted data comprises a WAL offset; and
  persisting the data of the set of messages for the transaction ID for the first ingestion node in a buffer of the first ingestion node.

Exemplary Operating Environment

The present disclosure is operable with a computing device (computing apparatus) according to an embodiment shown as a functional block diagram in FIG. 17. In an embodiment, components of a computing apparatus 1700 may be implemented as part of an electronic device according to one or more embodiments described in this specification. The computing apparatus 1700 comprises one or more processors 1719 which may be microprocessors, controllers, or any other suitable type of processors for processing computer executable instructions to control the operation of the electronic device. Alternatively, or in addition, the processor 1719 is any technology capable of executing logic or instructions, such as a hardcoded machine. Platform software comprising an operating system 1720 or any other suitable platform software may be provided on the computing apparatus 1700 to enable application software 1721 to be executed on the device. According to an embodiment, the operations described herein may be accomplished by software, hardware, and/or firmware.

Computer executable instructions may be provided using any computer-readable medium (e.g., any non-transitory computer storage medium) or media that are accessible by the computing apparatus 1700. Computer-readable media may include, for example, computer storage media such as a memory 1722 and communications media. Computer storage media, such as a memory 1722, include volatile and non-volatile, removable, and non-removable media implemented in any method or technology for storage of information such as computer readable instructions, data structures, program modules or the like. In some examples, computer storage media are implemented in hardware. Computer storage media include, but are not limited to, RAM, ROM, EPROM, EEPROM, persistent memory, non-volatile memory, phase change memory, flash memory or other memory technology, compact disc (CD, CD-ROM), digital versatile disks (DVD) or other optical storage, floppy drives, hard disks, magnetic cassettes, magnetic tape, magnetic disk storage, shingled disk storage or other magnetic storage devices, or any other non-transmission medium that can be used to store information for access by a computing apparatus. Computer storage media are tangible, non-transitory, and are mutually exclusive to communication media.

In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (memory 1722) is shown within the computing apparatus 1700, it will be appreciated by a person skilled in the art, that the storage may be distributed or located remotely and accessed via a network or other communication link (e.g., using a communication interface 1723).

The computing apparatus 1700 may comprise an input/output controller 1724 configured to output information to one or more output devices 1725, for example a display or a speaker, which may be separate from or integral to the electronic device. The input/output controller 1724 may also be configured to receive and process an input from one or more input devices 1726, for example, a keyboard, a microphone, or a touchpad. In one embodiment, the output device 1725 may also act as the input device. An example of such a device may be a touch sensitive display. The input/output controller 1724 may also output data to devices other than the output device, e.g., a locally connected printing device. In some embodiments, a user may provide input to the input device(s) 1726 and/or receive output from the output device(s) 1725.

The functionality described herein can be performed, at least in part, by one or more hardware logic components. According to an embodiment, the computing apparatus 1700 is configured by the program code when executed by the processor 1719 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

Although described in connection with an exemplary computing system environment, examples of the disclosure are operative with numerous other general purpose or special purpose computing system environments or configurations. Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices.

Examples of the disclosure may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

Aspects of the disclosure transform a general-purpose computer into a special purpose computing device when programmed to execute the instructions described herein. The detailed description provided above in connection with the appended drawings is intended as a description of a number of embodiments and is not intended to represent the only forms in which the embodiments may be constructed, implemented, or utilized.

The term "computing device" and the like are used herein to refer to any device with processing capability such that it can execute instructions. Those skilled in the art will realize that such processing capabilities are incorporated into many different devices and therefore the terms "computer", "server", and "computing device" each may include PCs, servers, laptop computers, mobile telephones (including smart phones), tablet computers, and many other devices. Any range or device value given herein may be extended or altered without losing the effect sought, as will be apparent to the skilled person. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

While no personally identifiable information is tracked by aspects of the disclosure, examples may have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure. It will be understood that the benefits and advantages described above may relate to one embodiment or may relate to several embodiments. When introducing elements of aspects of the disclosure or the examples thereof, the articles "a," "an," and "the" are intended to mean that there are one or more of the elements. The terms "comprising," "including," and "having" are intended to be inclusive and mean that there may be additional elements other than the listed elements. The term "exemplary" is intended to mean "an example of."

Having described aspects of the disclosure in detail, it will be apparent that modifications and variations are possible without departing from the scope of aspects of the disclosure as defined in the appended claims. As various changes may be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A computer-implemented method comprising:
   receiving, at a first ingestion node of a plurality of ingestion nodes, as part of a transaction, a first message, the first message identifying a transaction identifier (ID), a first count of messages for the transaction, and a portion of data for the transaction;
   persisting the data of the first message in temporary storage;
   determining a second count of messages for the transaction for the first ingestion node;
   based on at least the second count of messages, determining that the first ingestion node has received a complete set of messages for the transaction for the first ingestion node; and
   transmitting, by the first ingestion node, to a coordinator, a metadata write request, the metadata write request identifying the transaction ID, the first count of messages, and the second count of messages, and including a self-describing reference to persisted data of the set of messages for the transaction for the first ingestion node, wherein the self-describing reference identifies the first ingestion node, location information of the persisted data, and a range of the first data.

2. The computer-implemented method of claim 1, further comprising:
   identifying, by the coordinator, on an ongoing basis, a transactionally complete sub-set of data being processed by a set of ingestion nodes; and
   making the transactionally complete sub-set of data available for reading by a reader.

3. The computer-implemented method of claim 1, further comprising:
   identifying, by the coordinator, metadata write requests from a set of ingestion nodes of the plurality of ingestion nodes, the metadata write requests each including the transaction ID and a reference to persisted data, the set of ingestion nodes including the first ingestion node;
   determining that the transaction is complete;
   consolidating the references of the metadata write requests into a composite reference; and
   persisting the composite reference.

4. The computer-implemented method of claim 1, further comprising:
   transmitting, by the coordinator, a flush advisory to the first ingestion node, wherein the flush advisory comprises a trigger for persisting the data of the first message in a permanent storage.

5. The computer-implemented method of claim 1, further comprising:
   persisting the data of the first message in a permanent storage; and
   identifying, to the coordinator, location information and a range for the persisted data of the first message.

6. The computer-implemented method of claim 1, further comprising:
   partitioning messages for the transaction among the plurality of ingestion nodes, wherein the partitioning comprises assigning the first message to the first ingestion node.

7. The computer-implemented method of claim 1, wherein the first message further identifies the second count of messages.

8. The computer-implemented method of claim 1, further comprising:
   receiving, by the coordinator, the metadata write request from the first ingestion node; and
   receiving, by the coordinator, metadata write requests from others of the set of ingestion nodes.

9. A computer system comprising:
   a processor; and
   a non-transitory computer readable medium having stored thereon program code executable by the processor, the program code causing the processor to:
   receive, at a first ingestion node of a plurality of ingestion nodes, as part of a transaction, a first message, the first message identifying a transaction identifier (ID), a first count of messages for the transaction, and a portion of data for the transaction;
   persist the data of the first message in temporary storage;
   determine a second count of messages for the transaction for the first ingestion node;
   based on at least the second count of messages, determine that the first ingestion node has received a complete set of messages for the transaction for the first ingestion node; and
   transmit, by the first ingestion node, to a coordinator, a metadata write request, the metadata write request identifying the transaction ID, the first count of messages, and the second count of messages, and including a self-describing reference to persisted data of the set of messages for the transaction for the first ingestion node, wherein the self-describing reference identifies the first ingestion node, location information of the persisted data, and a range of the first data.

10. The computer system of claim 9, wherein the program code is further operative to:
    identify, by the coordinator, metadata write requests from a set of ingestion nodes of the plurality of ingestion nodes, the metadata write requests each including the transaction ID and a reference to persisted data, the set of ingestion nodes including the first ingestion node;
    determine that the transaction is complete;
    consolidate the references of the metadata write requests into a composite reference; and
    persist the composite reference.

11. The computer system of claim 9, wherein the program code is further operative to:

transmit, by the coordinator, a flush advisory to the first ingestion node, wherein the flush advisory comprises a trigger for persisting the data of the first message in a permanent storage.

12. The computer system of claim 9, wherein the program code is further operative to:
persist the data of the first message in a permanent storage; and
identify, to the coordinator, location information and a range for the persisted data of the first message.

13. The computer system of claim 9, wherein the program code is further operative to:
partition messages for the transaction among the plurality of ingestion nodes, wherein the partitioning comprises assigning the first message to the first ingestion node.

14. The computer system of claim 9, wherein the program code is further operative to:
receive, by the coordinator, the metadata write request from the first ingestion node; and
receive, by the coordinator, metadata write requests from others of the set of ingestion nodes.

15. A non-transitory computer storage medium having stored thereon program code executable by a processor, the program code embodying a method comprising:
receiving, at a first ingestion node of a plurality of ingestion nodes, as part of a transaction, a first message, the first message identifying a transaction identifier (ID), a first count of messages for the transaction, and a portion of data for the transaction;
persisting the data of the first message in temporary storage;
determining a second count of messages for the transaction for the first ingestion node;
based on at least the second count of messages, determining that the first ingestion node has received a complete set of messages for the transaction for the first ingestion node; and
transmitting, by the first ingestion node, to a coordinator, a metadata write request, the metadata write request identifying the transaction ID, the first count of messages, and the second count of messages, and including a self-describing reference to persisted data of the set of messages for the transaction for the first ingestion node, wherein the self-describing reference identifies the first ingestion node, location information of the persisted data, and a range of the first data.

16. The computer storage medium of claim 15, wherein the program code method further comprises:
identifying, by the coordinator, metadata write requests from a set of ingestion nodes of the plurality of ingestion nodes, the metadata write requests each including the transaction ID and a reference to persisted data, the set of ingestion nodes including the first ingestion node;
determining that the transaction is complete;
consolidating the references of the metadata write requests into a composite reference; and
persisting the composite reference.

17. The computer storage medium of claim 16, wherein the program code method further comprises:
prior to persisting the composite reference, routing a first read request for the data of the first message to the ingestion node; and
after persisting the composite reference, not routing a second read request for the data of the first message to the ingestion node.

18. The computer storage medium of claim 15, wherein the program code method further comprises:
persisting the data of the first message in a permanent storage; and
identifying, to the coordinator, location information and a range for the persisted data of the first message.

19. The computer storage medium of claim 15, wherein the program code method further comprises:
partitioning messages for the transaction among the plurality of ingestion nodes, wherein the partitioning comprises assigning the first message to the first ingestion node.

20. The computer storage medium of claim 15, wherein the first message further identifies the second count of messages.

* * * * *